US008578289B2

(12) United States Patent
Lai et al.

(10) Patent No.: US 8,578,289 B2
(45) Date of Patent: Nov. 5, 2013

(54) APPLICATION MODULE FOR MANAGING JOBS ASYNCHRONOUSLY

(75) Inventors: Brandon Lai, Morgan Hill, CA (US); Auston McReynolds, San Jose, CA (US); Dilip Varadarajan, San Jose, CA (US); Venkat Mavram, San Jose, CA (US)

(73) Assignee: eBay Inc., San Jose, CA (US)

( * ) Notice: Subject to any disclaimer, the term of this patent is extended or adjusted under 35 U.S.C. 154(b) by 498 days.

(21) Appl. No.: 12/872,802

(22) Filed: Aug. 31, 2010

(65) Prior Publication Data

US 2011/0185305 A1 Jul. 28, 2011

Related U.S. Application Data

(60) Provisional application No. 61/299,300, filed on Jan. 28, 2010.

(51) Int. Cl.
*G06F 3/048* (2013.01)

(52) U.S. Cl.
USPC .......................................... 715/772; 715/804

(58) Field of Classification Search
USPC .................................. 715/772, 804
See application file for complete search history.

(56) References Cited

U.S. PATENT DOCUMENTS

| 6,049,812 | A | * | 4/2000 | Bertram et al. | 715/205 |
| 6,874,130 | B1 | * | 3/2005 | Baweja et al. | 715/805 |
| 7,225,189 | B1 | * | 5/2007 | McCormack et al. | 1/1 |
| 7,533,336 | B2 | * | 5/2009 | Jaffe et al. | 715/243 |
| 7,743,026 | B2 | * | 6/2010 | Saliba et al. | 707/638 |
| 7,840,889 | B2 | * | 11/2010 | Mantuano et al. | 715/212 |
| 2005/0203762 | A1 | * | 9/2005 | Tebeau et al. | 705/1 |
| 2008/0189597 | A1 | * | 8/2008 | Garrett et al. | 715/212 |
| 2009/0138380 | A1 | * | 5/2009 | Roseman et al. | 705/27 |
| 2009/0158139 | A1 | * | 6/2009 | Morris et al. | 715/234 |
| 2009/0241048 | A1 | * | 9/2009 | Augustine et al. | 715/769 |
| 2009/0292591 | A1 | * | 11/2009 | Schultz et al. | 705/10 |
| 2009/0313537 | A1 | * | 12/2009 | Fu et al. | 715/212 |
| 2010/0318890 | A1 | * | 12/2010 | Billharz et al. | 715/212 |

* cited by examiner

*Primary Examiner* — Omar Abdul-Ali
(74) *Attorney, Agent, or Firm* — Schwegman Lundberg & Woessner, P.A.

(57) ABSTRACT

A method to synchronize data between a spreadsheet application and a marketplace application is disclosed. The method includes receiving a request to synchronize data items between the spreadsheet application and the marketplace application, the data items relating to a type of listing of items associated with the marketplace application. Additionally, the method includes executing a process to synchronize the data items between the spreadsheet application and the marketplace application, the process to include at least one of downloading one of the data items from the spreadsheet application and uploading one of the plurality of data items to the marketplace application, the executing of the process to occur independently of the executing of the spreadsheet application. Furthermore, the method includes displaying a status of the executing of the process in a native user interface element of the spreadsheet application.

17 Claims, 23 Drawing Sheets

| | Active Listings Report - 1/11/2010 1 | | | | |
|---|---|---|---|---|---|
| 1 | | | | | |
| 2 | Action(s) ▼ | Status ▼ | ItemID ▼ | Quantity ▼ | Format ▼ | StartPrice ▼ |
| 3 | | | 110001886562 | 12 | StoresFixedPrice | 498.99 |
| 4 | Revise | Pending Changes | 110001886735 | 10 | StoresFixedPrice | 19.99 |
| 5 | Revise | Pending Changes | 110001886736 | 8 | StoresFixedPrice | 15.99 |
| 6 | Revise | Pending Changes | 110001886737 | 7 | StoresFixedPrice | 18.99 |
| 7 | Revise | Pending Changes | 110001886741 | 9 | StoresFixedPrice | 9.55 |
| 8 | Revise | Pending Changes | 110001886742 | 3 | StoresFixedPrice | 7.99 |
| 9 | Revise | Pending Changes | 110001886763 | 7 | StoresFixedPrice | 22.00 |

APPLICATION MODULE FOR MANAGING JOBS ASYNCHRONOUSLY

RELATED APPLICATIONS

This application claims the benefit of U.S. Provisional Application No. 61/299,300, filed Jan. 28, 2010, entitled "APPLICATION MODULE FOR MANAGING JOBS ASYNCHRONOUSLY," which is incorporated herein by reference.

TECHNICAL FIELD

The present application relates generally to the field of batch processing, and, in one specific example, to using native user interface elements of a spreadsheet application executing on a client machine to manage the batch processing of programs executing on a server machine and associated with network-based publication system.

BACKGROUND

A user of a network-based publication system may perform various tasks with respect to the network-based publication system. For example, the user may use a spreadsheet application (e.g., Microsoft® Excel®) to manage information about multiple items that may be listed on the network-based publication system. Such items may include items the user has sold, is selling, or plans to sell using the network-based publication system. Additionally, the user may wish to add, modify, or remove multiple listings (e.g., advertisements of items for sale) on the network-based publication system that correspond to the multiple items.

The network-based publication system may provide various mechanisms to enable the user to perform the various tasks. For example, the network-based publication system may provide a mechanism (e.g., user interface of a web site) to enable the user to add, modify, or remove individual ones of the multiple listings. Furthermore, the network-based publication system may provide a mechanism to enable a user to import and export files (e.g., Comma Separated Value (CSV) files) to manually synchronize data items between the software application and a marketplace application of the network-based publication system. However, these mechanisms may not enable the user to perform the various tasks as efficiently as the user would like.

BRIEF DESCRIPTION OF THE DRAWINGS

Some embodiments are illustrated by way of example and not limitation in the figures of the accompanying drawings in which:

FIG. 9 is a block diagram illustrating a portion of a user interface of a spreadsheet application into which metadata has been integrated with native data validation features of the spreadsheet application;

FIG. 10 is a block diagram illustrating a portion of an example user interface of a spreadsheet application in which a cell of a worksheet of the spreadsheet application is used to denote a changed or updated value to a start price of an item;

FIG. 11 is a block diagram illustrating a portion of an example user interface of a spreadsheet application in which cells of a worksheet of the spreadsheet application are used to denote changed or updated values of quantities and start prices of multiple items;

DETAILED DESCRIPTION

Figure 1:
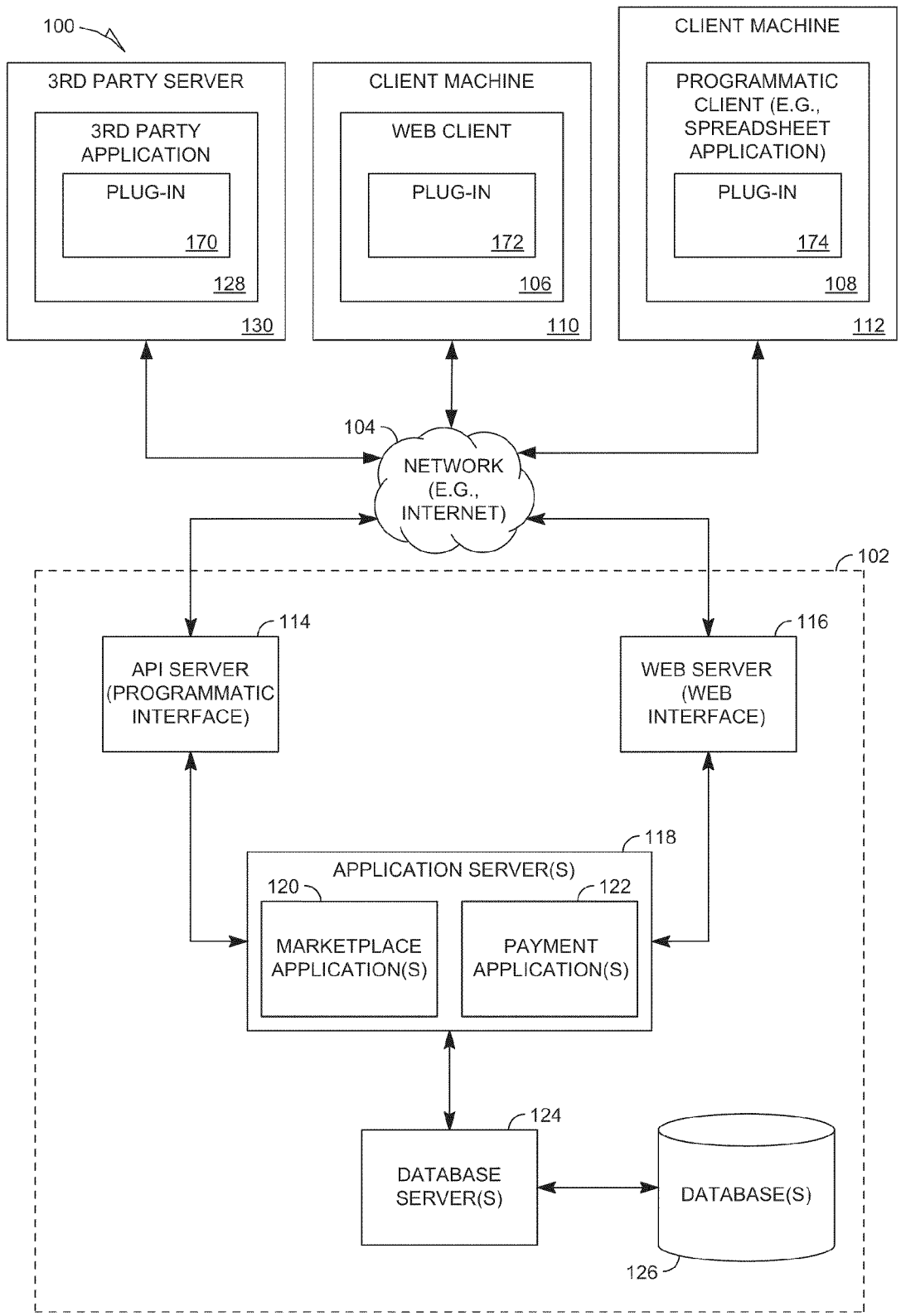
FIG. 1 is a network diagram depicting a client-server system, within which various example embodiments may be deployed.

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive subject matter in unnecessary detail, well-known instruction instances, protocols, structures, and techniques have not been shown in detail. As used herein, the term "or" may be construed in an inclusive or exclusive sense. The term "user" may be construed to include a person or a machine. The term "interface" may be construed to include an application program interface (API) or a user interface. The term "database" may be construed to include a database or a Not Only Structured Query Language (NoSQL) or non-relational data store (e.g., Google's BigTable or Amazon's Dynamo). The term "job" refers to a program (or sub-program) or process (or sub-process) capable of being executed on a computer. The phrase "network-based publication system" herein refers to a system that is connected to a network and publishes information via the network. The system may be an electronic commerce system. The information may include information pertinent to one or more products or one or more items. Examples of network-based publication systems include the online marketplaces operated by EBAY®, AMAZON®, and the classified listing service offered by CRAIGSLIST®.

A method to manage batch processing of a job is disclosed. The method includes discovering one or more functionalities of a first application. Additionally, the method includes exposing the functionalities of the first application in a second application (e.g., using native user interface elements of the second application). The method also includes receiving inputs relating to the functionalities (e.g., receiving inputs from a user to control an invocation of the functionalities). Furthermore, the method includes determining one or more jobs or to invoke the functionalities (e.g., based on how efficiently or quickly the job can be performed) and then executing the jobs. Finally, the method includes presenting the statuses or outputs relating to the jobs in a user interface (e.g., a native user interface element of the second application).

A method to synchronize data between a spreadsheet application and a marketplace application is disclosed. The method includes receiving a request to synchronize data items between the spreadsheet application and the marketplace application, the data items relating to a type of listing of items associated with the marketplace application. Additionally, the method includes executing a process to synchronize the data items between the spreadsheet application and the marketplace application, the process to include at least one of downloading one of the data items from the spreadsheet application and uploading one of the plurality of data items to the marketplace application, the executing of the process to occur independently of the executing of the spreadsheet application. Furthermore, the method includes displaying a status of the executing of the process in a native user interface element of the spreadsheet application.

Any of the methods described herein may be implemented as a computer system having one or more modules (e.g., hardware modules or software modules) configured to perform one or more of the methodologies discussed herein. The method may be configured by instructions stored on a machine-readable medium and executed by one or more processors of a machine (e.g., the machine of FIG. 21).

FIG. 1 is a network diagram depicting a client-server system 100, within which various example embodiments may be deployed. A networked system 102, in the example forms of a network-based marketplace or other publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112. Each of the one or more clients may include a software application module (e.g., a plug-in, add-in, or macro) that adds a specific service or feature to a larger system. The software application module may be separate from but tightly-integrated into a user interface and functionality of a software application, such as a spreadsheet application. The software application may be a client software application running on a client machine. For example, FIG. 1 depicts plug-ins 172 and 174 as being included in the web client 106 and the programmatic client 108, respectively. The software application module may be optionally deployed in the same environment as the software application such that the software application module can be accessed from within the software application. The software application module may be optionally enabled or disabled within the environment (e.g., user interface) of the software application. The software application module may appear to be a part of the software application by, for example, providing user interface components or widgets (e.g., menus, toolbars, menu commands, toolbar commands, and so on) that can be enabled, disabled, added to, or removed from standard user interface components or widgets provided by the software application.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases or NoSQL or non-relational data stores 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities. Additionally, although FIG. 1 depicts machines 130, 110, and 112 as being coupled to a single networked system 102, it will be readily apparent to one skilled in the art that machines 130, 110, and 112, as well as applications 128, 106, and 108 and plug-ins 170, 172, and 174, may be coupled to multiple networked systems. For example, the plug-ins 170, 172, and 174 may be couple to multiple payment applications 122, such as payment applications 122 associated with multiple payment processors (e.g., Visa, MasterCard, and American Express).

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102. FIG. 1 depicts plug-in 170 as being included in the third party application 128.

Figure 2:
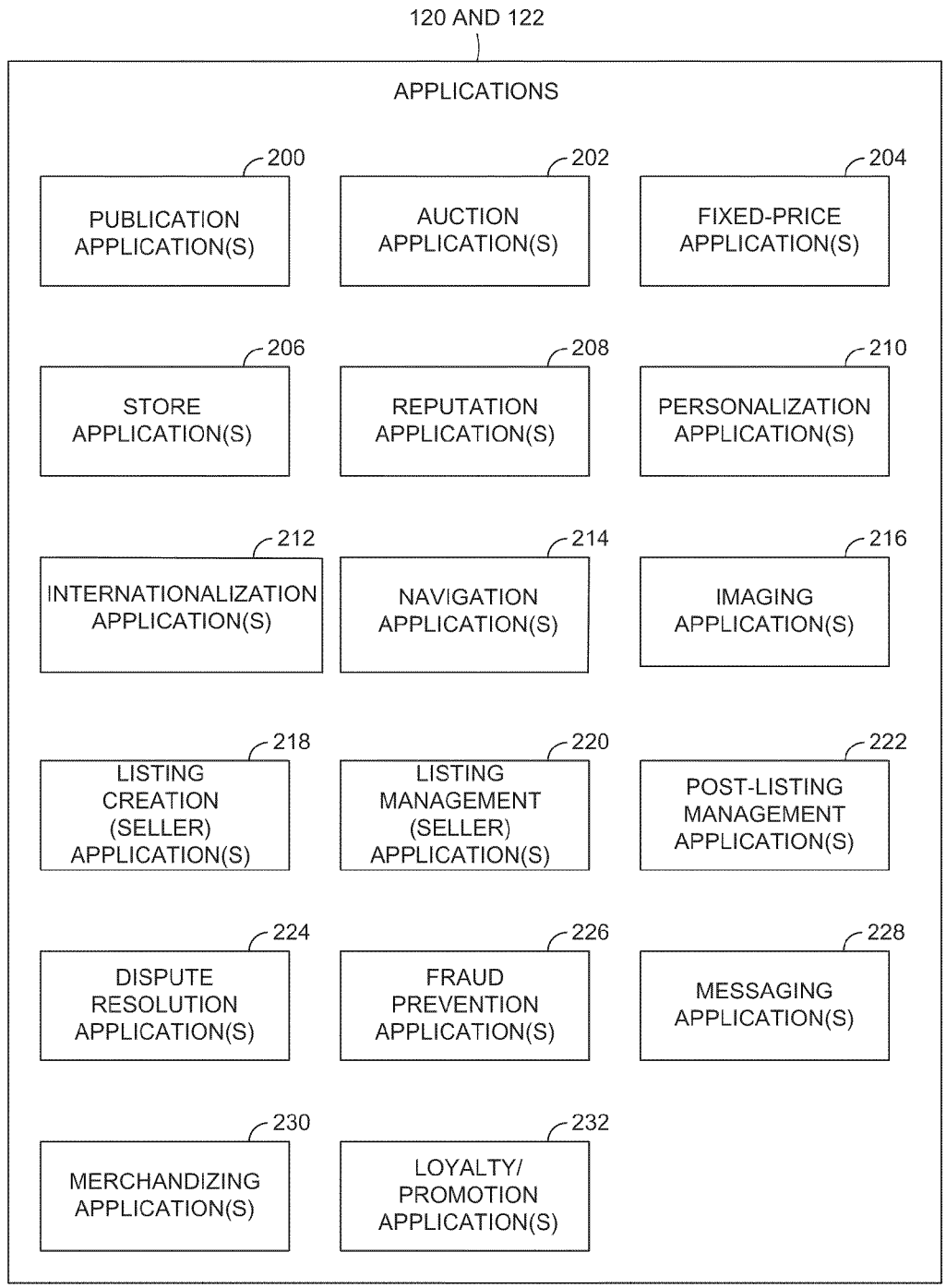
FIG. 2 is a block diagram illustrating multiple applications that, in one example embodiment, are provided as part of a networked system.

FIG. 2 is a block diagram illustrating multiple applications 120 and 122 that, in one example embodiment, are provided as part of the networked system 102. The applications 120 and 122 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable key word searches of listings published via the networked system 102. A browse application may allow users to browse various category, catalogue, or inventory data structures according to which listings may be classified within the networked system 102. Various other navigation applications may be provided to supplement the search and browsing applications.

In order to make listings, available via the networked system 102, as visually informing and attractive as possible, the marketplace applications 120 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. The listing creation application 218 and listing management applications 200 may allow sellers to manage listing in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular seller, and may be offered a reward for which accumulated loyalty points can be redeemed.

Figure 3:
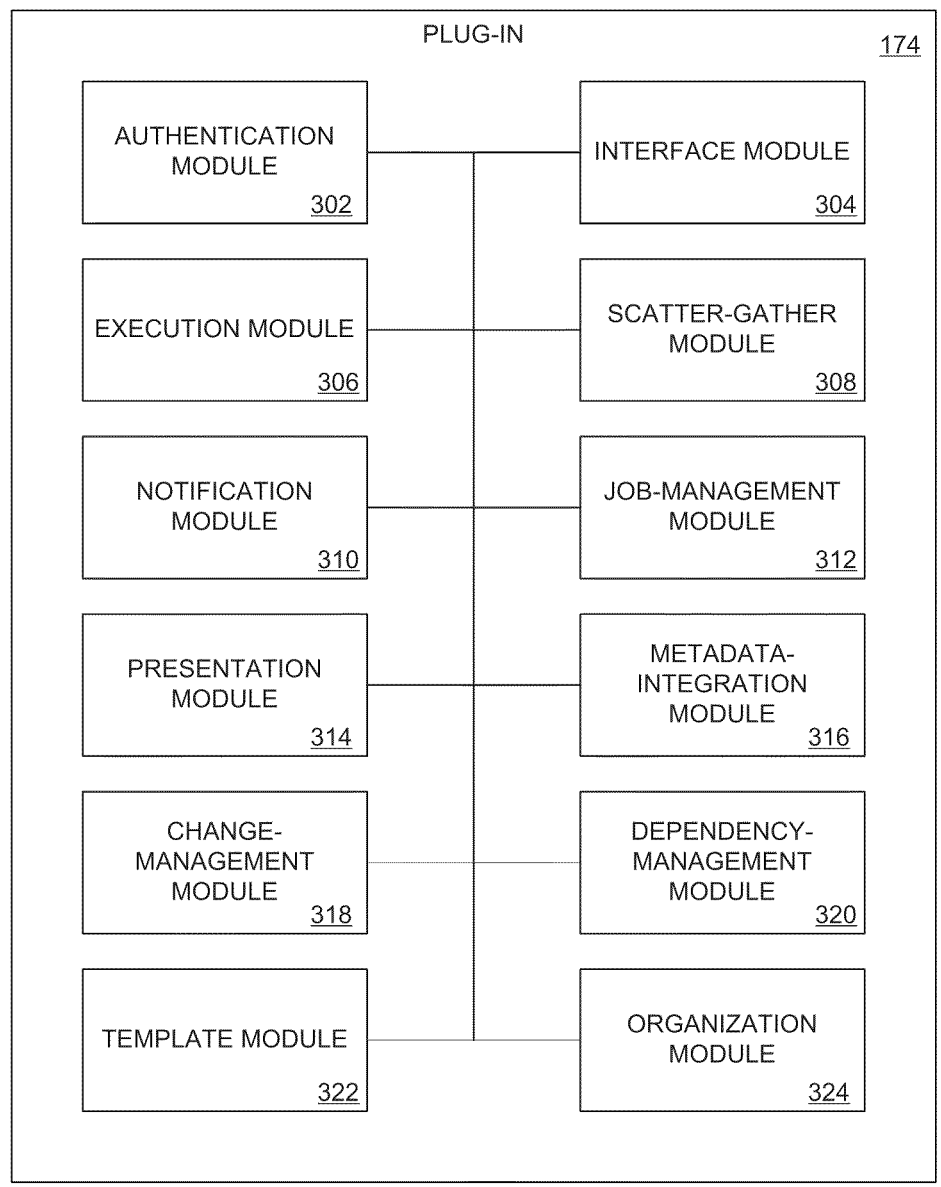
FIG. 3 is a block diagram illustrating modules of an example embodiment of the plug-in of FIG. 1.

FIG. 3 is a block diagram illustrating modules of an example embodiment of the plug-in 174 of FIG. 1. The plug-in 174 may be a spreadsheet plug-in integrated into a spreadsheet application (e.g., Microsoft Excel). Alternatively, although referred to herein as a "plug-in," the plug-in 174 may not be a plug-in at all, but rather a standalone software application. The plug-in 174 may execute (or "run") on a client machine.

The plug-in 174 may include an authentication module 302. The authentication module 302 may implement a plug-in method of authentication. The plug-in method of authentication includes interacting with an authorization or authentication process running on application servers 118, such as a standard authorization or authentication process used by one of the applications 120 or 122. The authentication module 302 may present a user interface associated with the plug-in method of authentication.

Figure 4:
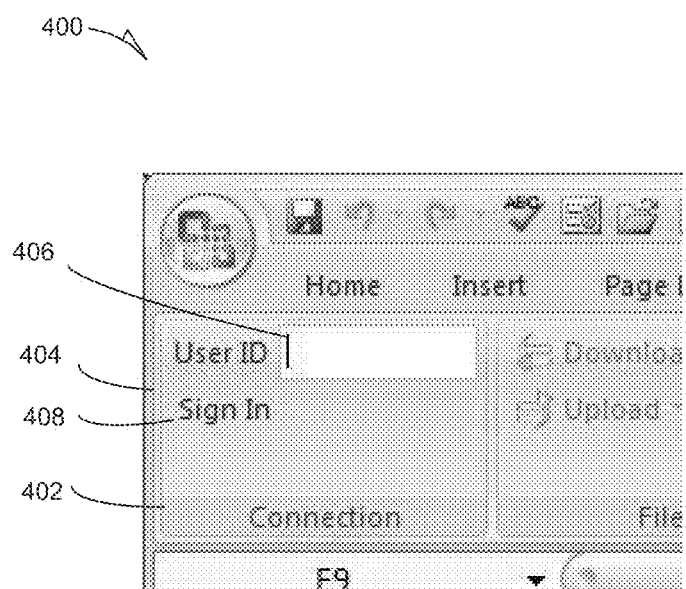
FIG. 4 is a block diagram illustrating an example portion of a user interface of the spreadsheet application into which an authentication mechanism has been integrated.

FIG. 4 is a block diagram illustrating an example portion 400 of a user interface of the spreadsheet application into which an authentication mechanism has been integrated. The example portion 400 includes a user interface associated with the plug-in method of authentication. The user interface associated with the plug-in method of authentication includes a login (e.g., "Connection") user interface component (or "widget") 402. The login user interface component 402 may be tightly integrated with other components or widgets of the spreadsheet application, such as menus, menu bars, or toolbars. For example, the login user interface component 402 may be integrated into the menu bar 404 of the spreadsheet application.

The login user interface component 402 allows the user of the spreadsheet application to specify login information or user credentials (e.g., a user identifier (ID) or a password). For example, the login user interface component 402 includes a text box 406 in which the user may enter a user ID. The login user interface component 402 also includes a button 408 (e.g., a "Sign In" button). Upon activation of the button 408 or receiving of the login information, the authorization module 302 initiates an authentication or authorization process. For example, the authentication module 302 provides the login information to the standard authorization or authentication process used by one of the applications 120 or 122. Upon receiving the login information from the authentication module 302, the authorization or authentication process makes a determination whether to grant the user of the spreadsheet plug-in access to one or more of the applications 120 and 122, such as the listing creation applications 218 or the listing management applications 220. If access is granted, the authentication module 302 may treat the login by the user as a successful login.

Upon a successful login, the authentication module 302 may store the login information or user credentials for later use. For example, the authentication module 302 may use the login information to automatically re-login the user to one of the applications 120 or 122 after a predetermined amount of time has elapsed since the user successfully logged in to the one of the applications. The login user interface component 402 may include a button (e.g., a "Sign Out" button) (not shown) to enable the user to logout from one of the applications 120 or 122 to which the user is successfully logged in. The user of the spreadsheet application may use the plug-in method of authentication instead of an alternative method of authentication, such as a web-page method of authentication. In other words, the authentication module 302 may provide, within the context of the spreadsheet application, all of the capabilities of an alternative method of authorization or authentication, thus making it unnecessary for the user to leave the context of the spreadsheet application to use the alternative method of authorization or authentication.

Figure 5:
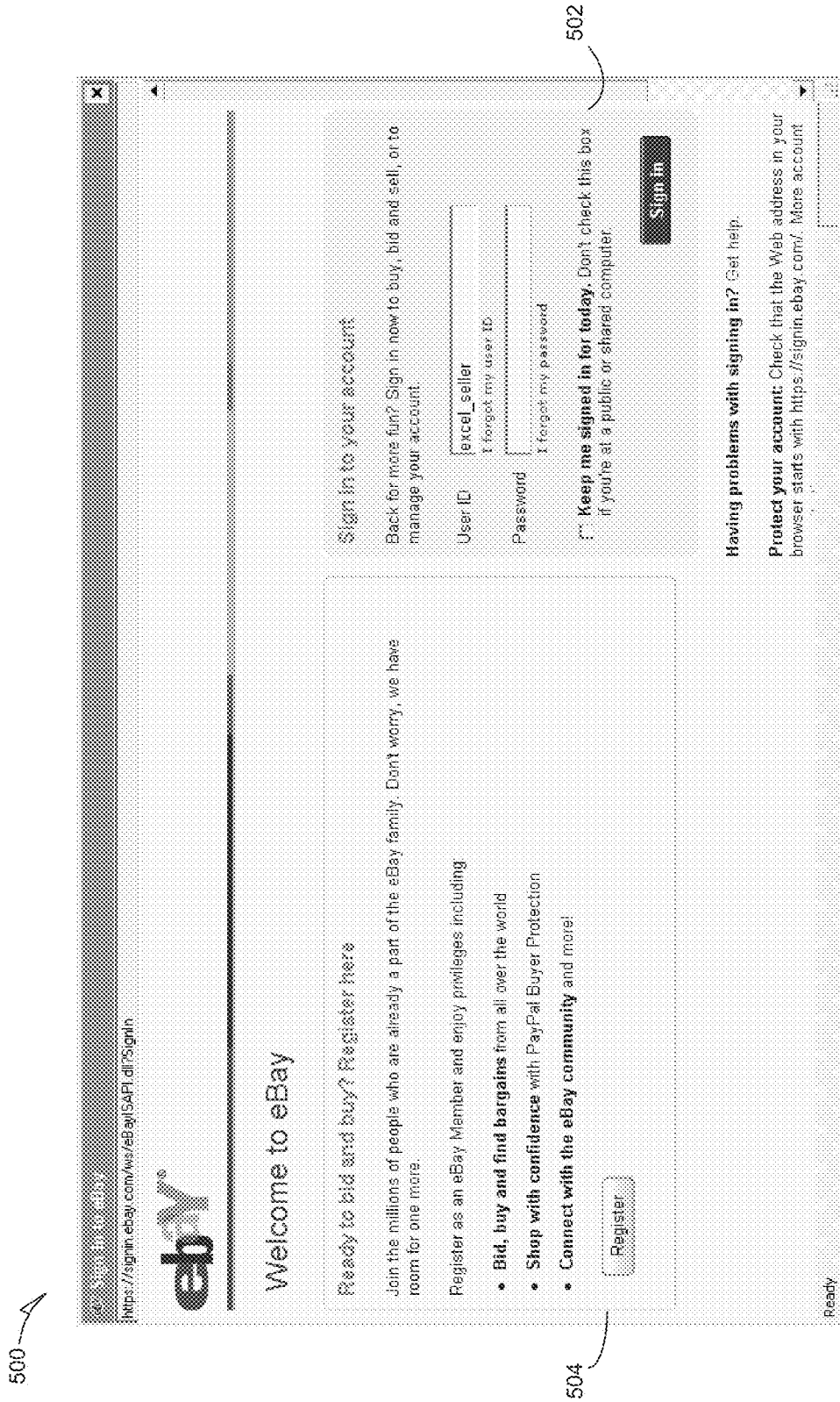
FIG. 5 is a block diagram illustrating an example user interface of an alternative method of user authorization or authentication.

FIG. 5 is a block diagram illustrating an example user interface 500 of an alternative method of user authorization or authentication. In an example embodiment, the networked system 102 presents a web page associated with a web-page method of authorization or authentication. The web-page method of authorization or authentication may be associated with one or more of the applications 120 or 122. A user accesses the web page from a web browser on a client machine. The web page may include a login widget 502 and a registration widget 504. The login widget 502 allows the user to specify login information (e.g., a user ID or password). The networked system 102 then uses the login information to attempt to authorize or authenticate the user with respect to one or more of the applications 120 or 122. For example, upon receiving the login information, the networked system 102 initiates an authorization or authentication process to determine whether to grant the user access to one or more of the applications 120 or 122. Based on the determination, the authentication module 302 treats the login as a successful login.

Referring back to FIG. 3, the plug-in 174 may include an interface module 304. The interface module 304 interfaces (or interacts) with the applications 120 or 122, including the listing creation applications 218 or the listing management applications 220, to determine one or more services or functionalities that the applications provide. The interface module 304 may expose in a user interface element (e.g., a menu or toolbar) of the spreadsheet application one or more commands corresponding to the services. In other words, the interface module 304 enables a user of the spreadsheet application to initiate one or more jobs (or processes) associated with the applications 120 or 122. Alternatively, the interface 304 initiates one or more jobs on behalf of the user. For example, the interface module 304 initiates a job in response to a scheduling of the job by the user or an administrator of one or more of the applications 120 and 122 or in anticipation of a user request based on a monitoring of previous requests by the user.

Figure 6:
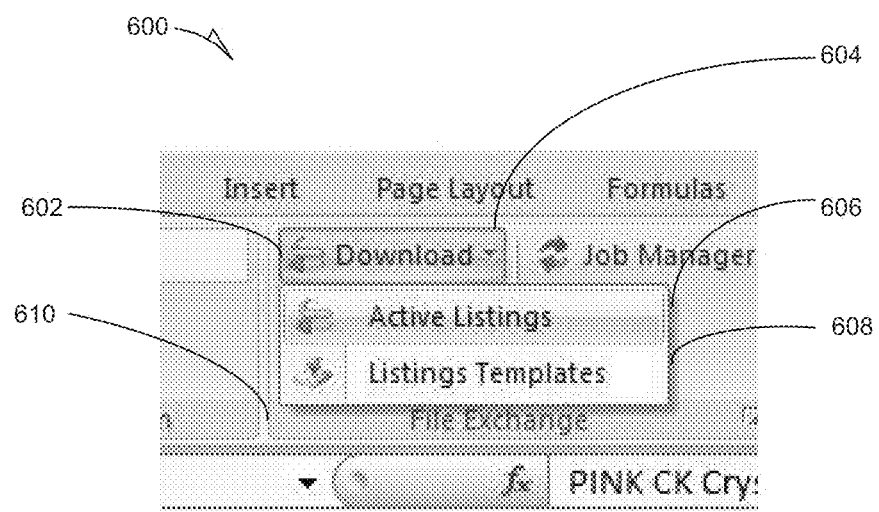
FIG. 6 is a block diagram illustrating a portion of an example user interface of a spreadsheet application into which user interface elements corresponding to functionalities of listing management applications have been integrated.

FIG. 6 is a block diagram illustrating a portion 600 of an example user interface of the spreadsheet application into which user interface elements 602 corresponding to functionalities of the listing management applications 220 have been integrated (e.g., by the interface module 304). The user interface elements 602 include a user interface element 604 (e.g., a drop-down button) integrated into a menu bar 610. The user interface element 604 includes additional user interface elements corresponding to functionalities of the listing management applications 220. Such additional user interface elements include a user interface element 606 (e.g., a menu item) corresponding to a function for downloading active listings and a user interface element 608 (e.g., a menu item) corresponding to a function for downloading a template for providing information of items having a particular type.

Figure 7:
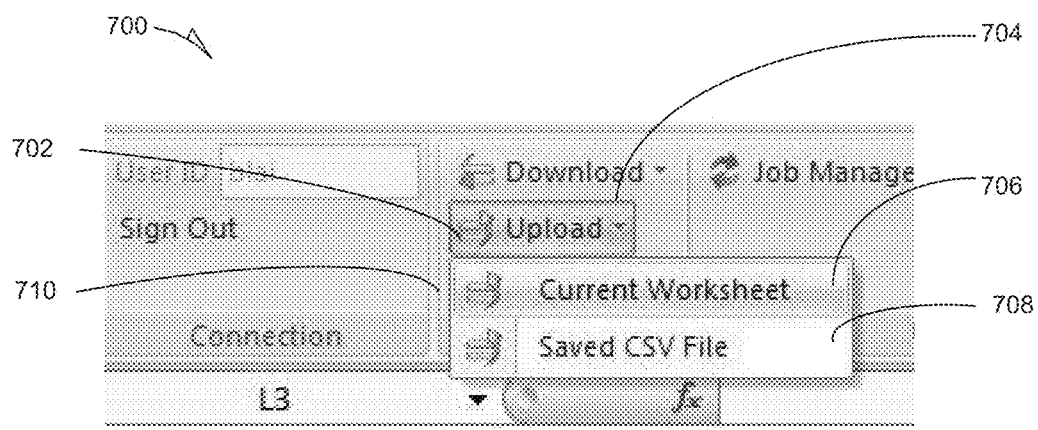
FIG. 7 is a block diagram illustrating a portion of an example user interface of the spreadsheet application into which additional user interface elements corresponding to additional functionalities of the listing management applications have been integrated.

FIG. 7 is a block diagram illustration a portion 700 of an example user interface of the spreadsheet application into which additional user interface elements 702 corresponding to additional functionalities of the listing management applications 220 have been integrated (e.g., by the interface module 304). The user interface elements 702 include user interface element 704 (e.g., a drop-down button) integrated into a menu bar 710. The user interface element 704 includes additional user interface elements corresponding to functionalities of the listing management application 220. Such additional user interface elements include a user interface element 706 corresponding to a function for uploading a worksheet of the spreadsheet application and a user interface element 708 corresponding to a function for uploading a saved file. The file may have a standard format (e.g., the Microsoft Excel CSV format). Alternatively, the file may have a non-standard format, such as a format associated with a particular e-commerce site (e.g., a non-standard format associated with Amazon.com). Thus, the interface module 304 may enable the user to upload data modifications directly from the spreadsheet application without having to export a CSV file and invoke a separate application (e.g., a web browser) to upload the CSV file. The spreadsheet plug-in may post the job and add the job ID into the job manager. Furthermore, interface module 304 may be capable of transcoding data on the fly from one format to another such that, for example, a seller can maintain a set of item listings in a spreadsheet that can be used at multiple e-commerce sites (e.g., eBay and Amazon) through, for example, importing, exporting, uploading, or downloading functions provided by the spreadsheet plug-in.

The user interface elements 702 may include additional user interface elements (not shown) corresponding to other functionalities of the listing management applications 220, such as downloading listings waiting to be paid, downloading listings waiting to be shipped, downloading listings that need feedback, downloading questions that need to be answered, downloading fees posted to user account(s), uploading revised listings, or uploading new listings.

Additional ones (not shown) of user interface elements 602 or 702 may correspond to one or more functionalities of other ones of the applications 120 or 122. Such functionalities may include adding, revising, relisting, and ending listings; leaving feedback; managing shipping status; downloading fees; pulling down orders for fulfillment; getting fee settlement reports; getting listing analytics; printing shipping (postage) labels; or uploading media (e.g., photos or videos). The user interface elements 602 or 702 for invoking the functionalities of the applications 120 or 122 may be tightly integrated with the user interface of the spreadsheet application. For example, the user interface elements 702 may include native user interface elements of the spreadsheet application or be integrated into the user interface of the spreadsheet application. The user interface elements 702 may provide an option to initiate a job as a synchronous or asynchronous job.

Referring back to FIG. 3, the plug-in 174 may include an execution module 306. The execution module 306 executes a job as a synchronous job or an asynchronous job. When executing a job as a synchronous job, the execution module 306 prevents execution of other jobs until the synchronous job is complete. When executing a job as an asynchronous job, the execution module 306 allows execution of other jobs while the asynchronous job is being performed. The execution module 306 may make a determination whether to initiate the job as an asynchronous job or a synchronous job. For example, the execution module 306 may determine whether the job involves a calculation, a transferring, or another manipulation of data that may prevent a client machine from performing other tasks for more than a threshold amount of time, such as the amount of time a typical user may be willing to wait for the data manipulation to complete. Alternatively, the execution module 306 may initiate a job as an asynchronous job or a synchronous job according to a request by the user (e.g., a request received via the interface module 304) to initiate the job as an asynchronous job or a synchronous job, respectively. The execution module 306 may invoke the functionality of the applications 120 and 122 via an API provided by the applications 120 and 122, or via another communication mechanism.

The one or more jobs may, in turn, spawn their own fully-fledged jobs. For example, the execution module 306 may initiate a job that affects an entity in the United States. The execution module 306 may determine through business logic (e.g., predetermined or configurable dependency relationships between jobs) that an entity in the United Kingdom should also be affected. In this case, the execution module 306 may create or spawn (or schedule the creation or spawning of) a separate job that affects the entity in the United Kingdom.

The plug-in 174 may include a scatter-gather module 308. The scatter-gather module 308 may, within a single procedure call, synchronously or asynchronously write data from multiple buffers to a single data stream or read data from a data stream to multiple buffers. The buffers may be implemented as a vector of buffers from which data is gathered or scattered into. The scatter-gather module 308 may enable the plug-in 704 to use parallel processing (e.g., via the execution module 306) to process a large job. For example, the scatter-gather module 308 may break up a large job into smaller, more manageable jobs, which may then be processed simultaneously on one or more machines. The scatter-gather module 308 may make a determination of how to break up or distribute a job based on, for example, improving concurrency or efficiency of computing resources relative to a non-scatter-gather processing method. The scatter-gather module 308 may determine a priority of a job based on predetermined or configurable settings associated with a job, such as a job having a particular type. The scatter-gather module 308 may support both input/output (I/O) bound or central processing unit (CPU) bound tasks.

The scatter-gather module 308 may include a scheduler that decides when a task is allowed to run. The scheduler may use a predictive scheduling algorithm that is based on a job's priority or a capacity of available resources. The scheduler may have a built-in throttling mechanism that takes into account different times of a day (e.g., peak or off-peak time windows) or the available capacity of local or remote resources to be used when executing a job. The scheduler may allocate computing resources to a job. The scheduler may ensure that a large job does not block out resources for a small job. If two jobs of the same priority or size are started at the same time, then the scheduler may ensure that the two jobs finish at the same time. The scatter-gather module 308 may include support for error-handling and retries. If a recoverable error is encountered during an execution of a job, then the scatter-gather module 308 may allow the spreadsheet plug-in to automatically retry the job. If a non-recoverable error is encountered, then the scatter-gather module 308 may fail the job and not retry it. The scatter-gather module 308 may use or be built upon a separate framework that manages an underlying queuing and transport layer.

In one example, the scatter-gather module 308 may assist the execution module 306 in processing a job to add a large set of item listings to an e-commerce site. For example, the scatter-gather module 308 may divvy up or parallelize the API calls used to add the large set of item listings.

To process a job, the execution module 306 may make a call (e.g., a function call) to the applications 120 and 122 specifying what it desires. In other words, the execution module 306 may invoke a service of the applications 120 and 122 (e.g., in response to a user request). For example, the execution module 306 may make a call to applications 120 and 122 requesting active item listings for a particular seller. Such a call is shown in the following example as pseudo-Extensible Markup Language (XML). One skilled in the art will recognize that this call may be just as easily shown using any data interchange format, such as JavaScript Object Notation (JSON).

```
<jobRequest>
    <type>ActiveListings</type>
</jobRequest>
```

The applications 120 and 122 may return a response of success if the user has not exceeded an allocated amount of resources for a predetermined or configurable time period; otherwise, the applications 120 and 122 may return a response of failure. The applications 120 and 122 may also include in the response a handle (e.g., a job ID) corresponding to the job. The execution module 306 may use the handle to poll applications 120 and 122 for the status of the job. For example, the execution module 306 may use the handle to request the status of the job at a predetermined or configurable interval or upon a manual request by the user. Applications 120 and 122 may return status information about the job. The status information may include a summary, description, or percentage of completion of the job.

```
<jobResponse>
    <jobId>39324023</jobId>
</jobResponse>
```

While jobs are running, the scatter-gather module 308 may use a job registry to determine types of handlers that may be invoked for a particular job during various stages of execution of the particular job. The scatter-gather module 308 may, for example, store or retrieve information about types of jobs in the job registry and then make a determination of how to handle the execution of a particular job based on its type. In one execution stage, the scatter-gather module 308 may reduce a problem (or a job) into a set of sub-problems (or sub-jobs) that can be distributed to other machines or virtual instances (e.g., separate machines in a cluster). In another execution stage, the plug-in 174 may register (e.g., via the execution module 306) the sub-jobs with the scatter-gather module 308 described above. The registration process may include determining and setting a schedule of execution for the sub-jobs. In another execution stage, upon completion of sub-jobs of a particular job, the execution module 306 may be notified that it can finalize the particular job. In another execution stage, the execution module 306 may mark a job as completed.

For example, to process a job to request active listings for a particular seller, the execution module 306 invokes a search functionality of the applications 120 and 122 that results in the execution module 306 being provided a list of active item IDs (or job IDs). The scatter-gather module 308 splits these active item IDs into sub-jobs. The execution module 306 then executes each sub-job to collect relevant information pertaining to that item and write the relevant information into a database. Upon completion of the sub-jobs, the execution module 306 combines the results of the sub-jobs into one cohesive entity (e.g., a file). While a job is executing, the execution module 306 polls for the status of a job by supplying the job ID to the applications 120 and 122.

The applications 120 and 122 may create or register a job with the scatter-gather module 308. The applications 120 and 122 may further insert the job into a job queue managed by the scatter-gather module 308. The scatter-gather module 308 may, at a predetermined interval, look for unscheduled jobs and, through a scheduling algorithm, decide whether each of the unscheduled jobs can be executed (e.g., via the execution module 306).

The plug-in 174 may include a notification module 310. The notification module 310 may support notifications from the spreadsheet plug-in or the applications 120 or 122. For example, the notification module 310 allows a user to subscribe to receive notifications of, for example, a completion of a job or a meeting of a predetermined or configurable condition, such as an execution of a job transgressing a threshold of running time or consumed resources. The notification module 310 pushes notifications to a predetermined or configurable destination, such as a Uniform Resource Locator (URL) or e-mail address. Furthermore, the notification module 310 distributes notifications through a messaging service, such as Twitter, BlackBerry Messenger, or another messaging service.

The plug-in 174 may include a job-management module 312. The job-management module 312 may maintain a list of jobs. A job may be added to the list of jobs upon a request for an initiation of the job or upon notice of a successful receipt (e.g., by one of the applications 120 or 122) of the request for the initiation of the job. The job-management module 312 may display a user interface to enable a user to view information about the jobs. The user interface may present information about each job in the list of jobs, such as a status of each job.

Figure 8A:
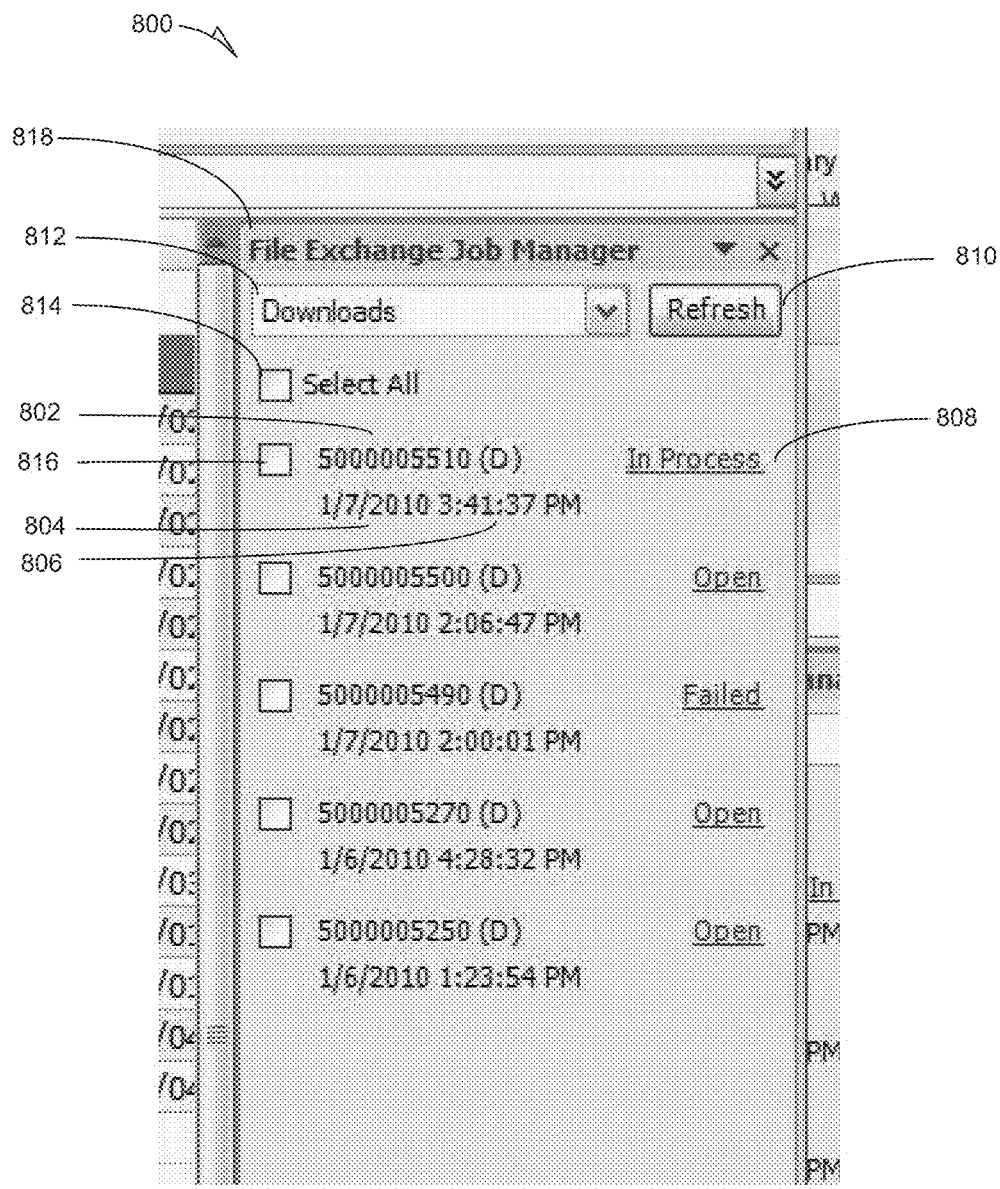
FIG. 8A is a block diagram illustrating an example portion of a user interface of a spreadsheet application that includes job manager user interface element.

FIG. 8A is a block diagram illustrating an example portion 800 of a user interface of the spreadsheet application that includes job manager 818. The job manager 818 displays information about each of the jobs in a list of jobs. The information includes a job ID 802, a date 804 or a time 806 that the job was initiated, or a status 808 of the job. The status 808 may be "In Process," "Open," "Failed," or another status, such as a particular status communicated (e.g., via the interface module 304) from the applications 120 and 122 to the plug-in 174. The job-management module 312 may automatically poll the applications 120 and 122 for the status of each job in the list of jobs at a predetermined interval or from a process running on the client in the background of the spreadsheet application (e.g., whenever the client or spreadsheet application is idle). Alternatively, the user may manually request an immediate update of the status of one or more jobs in the jobs list. For example, the job manager 818 includes a user interface element 810, such as a Refresh button, for updating status information for all or a subset of the jobs in the list. When the user chooses the user interface element 810, the job-management module 312 automatically updates the statuses of one or more jobs. Furthermore, the status 808 may merely be a summary status for which more information (e.g., a complete status) exists. For example, a user may be able to select a status summary for a particular job embodied as a link to bring up a separate display (not shown) that includes more complete status information for the particular job.

The job-management module 312 may include a filtering or organizing mechanism. The filtering or organizing mechanism may enable a user to select a subset of jobs on which to operate. For example, the filtering or organizing mechanism enables the user to filter status information relating to jobs of a particular type. Or the filtering or organizing mechanism enables the user to refresh the status of selected ones of the jobs. The job-management module 312 exposes the filtering or organizing mechanism through various user interface elements of the job manager 818. For example, the job manager 818 includes a filtering user interface element 812, such as a drop-down box, that includes one or more types of jobs by which the list of jobs may be filtered. For example, the user uses the filtering user interface element 812 to specify that the list of jobs presented in the user interface should be limited to jobs related to "Downloads." The job manager 818 includes a user interface element 814 (e.g., a "Select All" check box) for selecting all of the jobs in a job list (e.g., a list of jobs filtered by job type). The job manager 818 includes a user interface element 816 (e.g., a check box) for selecting a job. The selection of one or more jobs may limit subsequent operations (e.g., updating of statuses) of the job-management module 312 to the selected jobs.

The job-management module 312 may include a mechanism to manage life cycles of one or more jobs, including adding, modifying, or removing the jobs. Additionally, the job manager may support a cancelling of a job that has not started or an aborting a job that has already started. In the case of an aborting of a job, the job-management module 312 may (e.g., via a presentation module 314, described below) reflect committed changes in a worksheet or workbook of the spreadsheet application or roll back the committed changes such that the rolled back changes are not reflected in the worksheet or workbook.

Figure 8B:
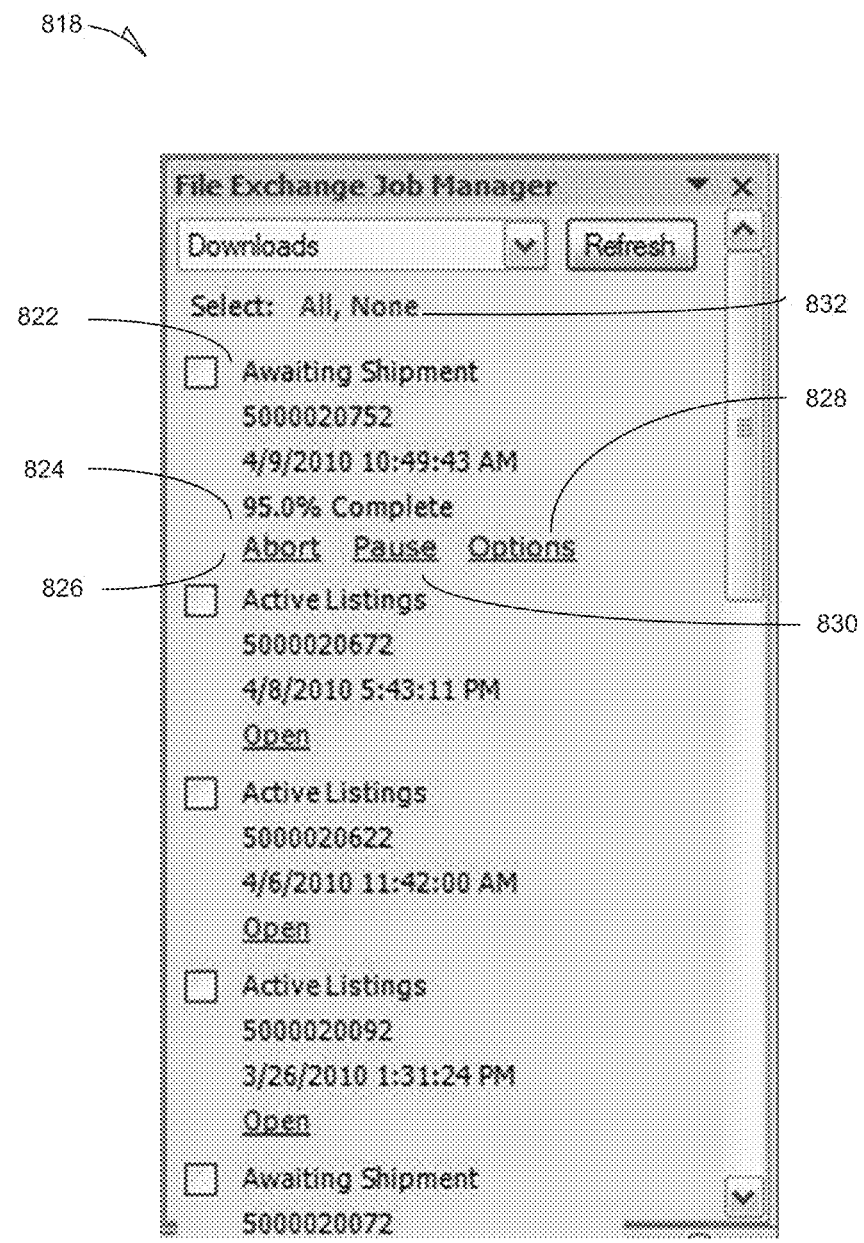
FIG. 8B is a block diagram illustrating an example embodiment of a job manager having user interface elements for managing life cycles of one or more jobs.

FIG. 8B is a block diagram illustrating an example embodiment of the job manager 818 having user interface elements corresponding to the mechanisms of the job-management module 312 for managing life cycles of one or more jobs. The job manager 818 presents information about the types 822 of items associated with the marketplace application to which each job in the list relates (e.g., items "Awaiting Shipment" or items in "Active Listings"). The job manager 818 specifies a progress 824 of a completion of each job (e.g., a percentage complete). The job manager 818 includes a control 826 for aborting a job. The job manager 818 includes a control 830 for pausing a job. The job manager 818 includes a control 828 for performing other operations with respect to a job. The other options may include showing a location of a file corresponding to the job, such as an original CSV file, reposting a file, removing the job, or modifying configuration options associated with the job. The other options may relate to scheduling of dates, times, or intervals at which the plug-in 174 initiates a job (e.g., provides updates to the applications 120 and 122) or dates, times, or intervals at which applications 120 and 122 send data to the plug-in 174 for processing in a job. The job manager 818 includes a control 832 for selecting all or none of the jobs in a list of jobs (e.g., relating to downloads of data items).

The job-management module 312 may present information regarding a processing (e.g., via the execution module 306) of multiple jobs simultaneously. For example, if multiple processes are initiated such that they are executing concurrently, the statuses of each of the concurrently executing jobs may be designated within the job-manager as being in process.

Figure 8C:
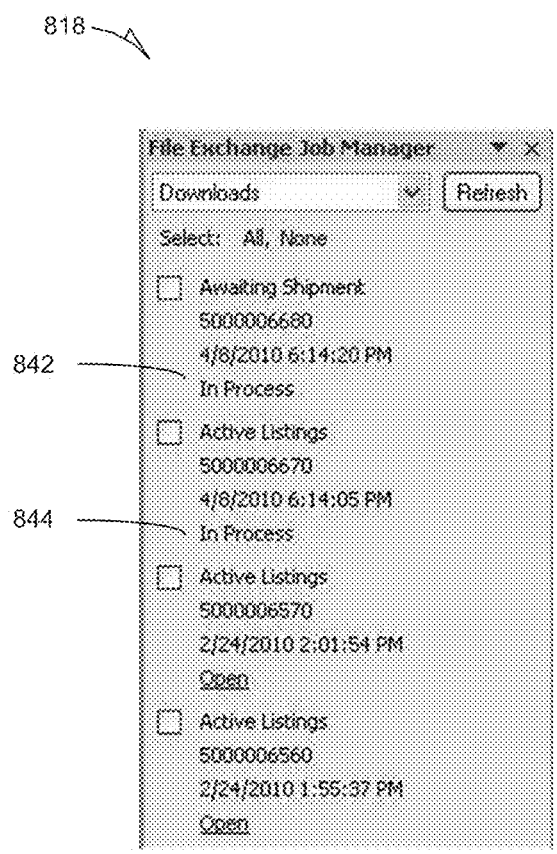
FIG. 8C is a block diagram illustrating an example embodiment of a job manager in which two jobs are shown to be executing concurrently.

FIG. 8C is a block diagram illustrating an example embodiment of the job manager 818 in which two jobs are shown to be executing concurrently. Information 842 associated with the first of the two jobs indicates that the first job is "In Process." Similarly, information 844 associated with the second job indicates that the second job is also "In Process."

The job manager 818 may be tightly integrated into the user interface of the spreadsheet application by, for example, using native user interface components (or elements or widgets) of the spreadsheet application or operating system on which the spreadsheet application is deployed. Such native user interface components may include dialog boxes, buttons, drop-down list boxes, check boxes, and so on. Additionally, the job manager 818 may be made accessible from a menu, menu bar, or toolbar of the spreadsheet application. For example, the job manager 818 may be shown or hidden in response to a selection by a user of a menu bar item (e.g., a "Job Manager" button) integrated into the spreadsheet application.

Referring back to FIG. 3, the plug-in 174 may include a presentation module 314. Before, during, or after execution of a job, the plug-in 174 may receive (e.g., via the interface module 304 or the execution module 306) data associated with the job from the applications 120 and 122. The data includes any data that the applications 120 or 122 are capable of providing. The execution module 306 may store the data in a memory, file system, database, or other data storage medium accessible to the spreadsheet application, such as a storage medium on the client machine or third party server. The presentation module 314 may import or present the data in a worksheet or workbook of the spreadsheet application. For example, in response to an initiation of a job to download all listings for a particular seller, the execution module may receive data corresponding to all of the listings for the particular seller. The presentation module 314 may automatically import the data from memory or another data storage medium into the spreadsheet application. The presentation module 314 may also format the data such that the data is organized and easily accessible to the user for further manipulation. For example, the presentation module 314 may present the data in columns according to categories associated with the data (e.g., by the applications 120 or 122). The presentation module 314 may unify or consolidate data received from multiple applications and multiple networked systems. For example, the presentation module 314 may present data associated with items listed on multiple networked-based publication systems (e.g., Amazon.com and eBay) in a single worksheet or workbook of the spreadsheet application.

The plug-in 174 may include a metadata-integration module 316. The data received by the plug-in 174 may include metadata associated with a job, such as a list of shipping providers, valid handling times, return policy options, and so on, corresponding to an item associated with the job. The metadata-integration module 316 may use such metadata to enumerate lists of values corresponding to attributes of the item for selection by the user from within the spreadsheet application. The metadata-integration module 316 may integrate such lists of values with native data validation features of the spreadsheet application.

Figure 9:
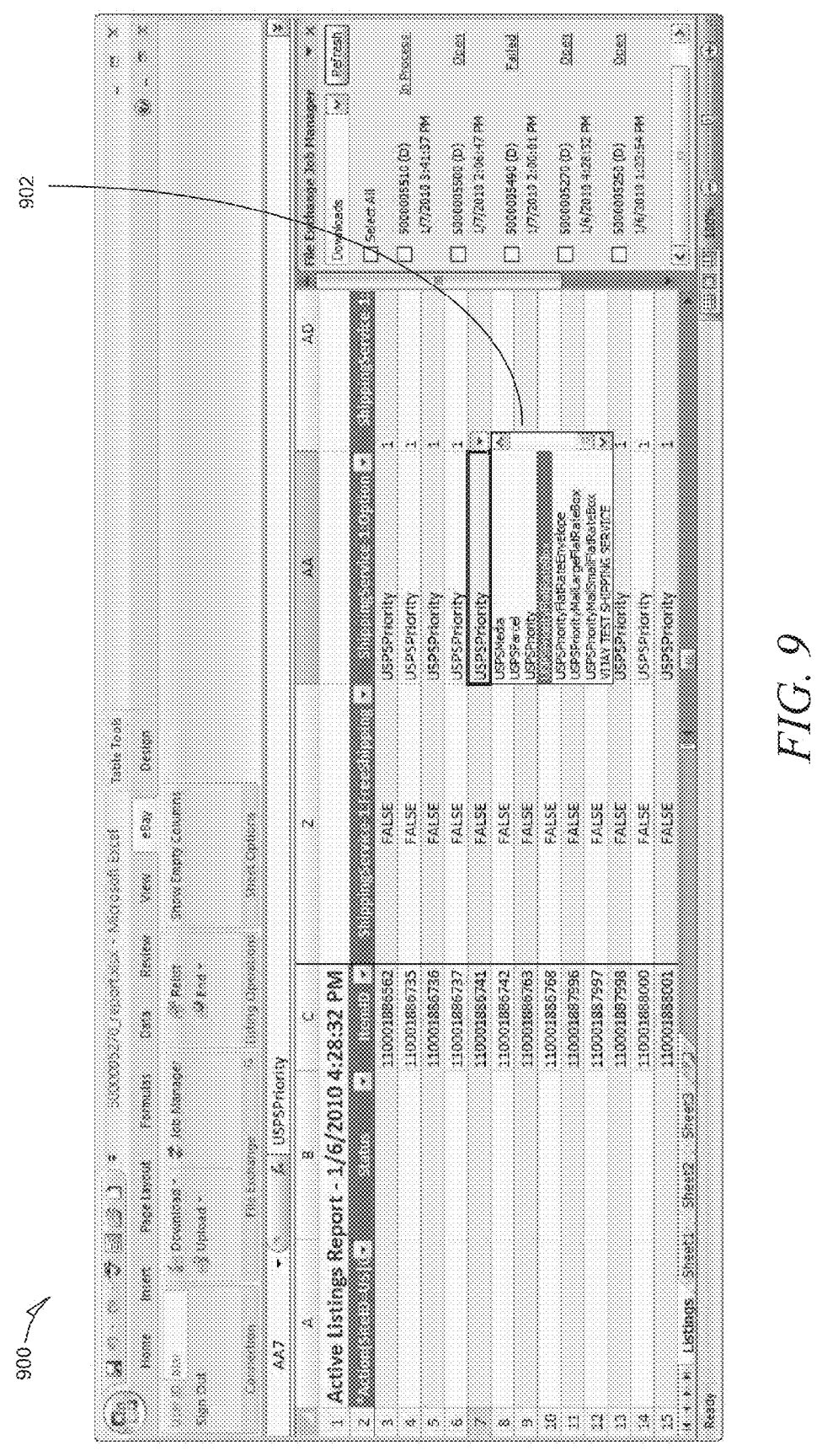

FIG. 9 is a block diagram illustrating a portion 900 of a user interface of a spreadsheet application into which metadata has been integrated (e.g., via the metadata-integration module 316) with native data validation features of the spreadsheet application. The plug-in 174 receives (e.g., via the execution module 306) a list of United States Postal Service (USPS) shipping service options as metadata, including shipping service options labeled "USPSPriority," "USPSMedia," "USPS Parcel," and so on. The metadata-integration module 316 integrates the list with the native data validation features of the spreadsheet application such that the user's selection of a shipping service option for a particular item may be restricted to the shipping service options in the list. For example, the metadata-integration module 316 presents (e.g., via the presentation module 314) the list in a user interface element 902 (e.g., drop-down list box component associated with a cell of a worksheet of the spreadsheet application). Alternatively, the metadata-integration module 316 integrates the list with the native data validation features of the spreadsheet application such that the user's selection of a shipping service option for a particular item may optionally come from the list.

The metadata-integration module 316 may request and receive metadata independently from a job invoking a particular functionality of the application 120 and 122. For example, the metadata-integration module 316 may request and receive general data related to an ecosystem of an e-commerce site that may be associated with a worksheet of the spreadsheet application. Such general data may include data that is generally useful for managing a business. For example, the metadata may include a list of available categories for item listings or products that are closely related to a specific product. The metadata-integration module 316 may provide a mechanism for selecting one or more general metadata items for downloading independently of, for example, a request to create or modify an advertisement of an item on a listing of items for sale.

Referring back to FIG. 3, the plug-in 174 may include a change-management module 318. The change-management module 318 may maintain a log of changes to data capable of being processed by the spreadsheet application, including changes to a workbook, a worksheet, or a cell. The log of changes may include changes to data that occur as a result of a successful completion of a job (e.g., a request for data from the applications 120 and 122) or a partial execution of a job (e.g., receiving one of a set of data items to be received from the applications 120 and 122). The log of changes may also include changes to data that occur as a result of an interaction of the user with the spreadsheet application (e.g., an entering by the user of a new value for a particular cell of a worksheet). The change-management module 318 may automatically denote (e.g., using the presentation module 314) cells for which values have been changed or updated (e.g., between jobs, between predetermined times, during an execution of a job, or by an action of the user).

The change-management module 318 may enable a user to roll back, view a history of, or otherwise manage changes or updates to the spreadsheet. The change-management module 318 may maintain snapshots of data associated with a worksheet, including cells of a worksheet, such that the content of the worksheet may be restored to any point in the history of changes made to the spreadsheet. The change-management module 318 may maintain the snapshots in a database, file system, or other storage medium. Furthermore, the change-management module 318 may provide the snapshots to the applications 120 and 122 for storage on the application servers 118. The change-management module 318 may present a user interface to allow the user to invoke the functionality of the change-management module 318 to manage changes or updates to the spreadsheet.

The change-management module 318 may monitor individual changes to data in the spreadsheet such that the changes can be processed by the applications 120 and 122 as individual jobs or as a single job, such as a batch job. The change-management module 318 may accumulate the individual changes in a memory, a database, a file system, or another storage medium. The change-management module 318 may initiate one or more jobs relating to the changes, however they are embodied, to the applications 120 and 122 in response to a command by the user, at a predetermined date or time, at a predetermined time interval, or lazily (e.g., when the client or spreadsheet application is idle). For example, the change-management module 318 may send accumulated changes to applications 120 and 122 as a single batch job relating to synchronizing the data between the spreadsheet application and the applications 120 and 122. Like many interactions between the plug-in 174 and applications 120 and 122, the plug-in 174 may handle requests to applications 120 and 122 involving notification of updates to or synchronization of data as synchronous or asynchronous jobs.

The change-management module 318 may be tightly integrated with the spreadsheet application such that the denoting of a changed or updated value, such as a value of a cell of a worksheet, involves the use of a native user interface component of the spreadsheet application.

Figure 10:
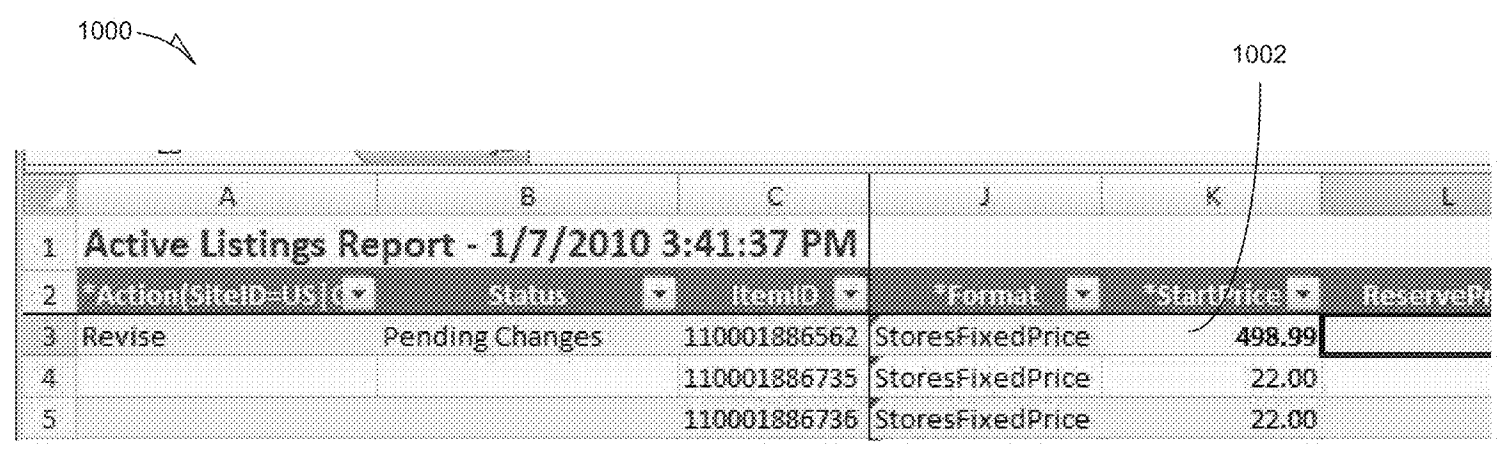

FIG. 10 is a block diagram illustrating a portion 1000 of an example user interface of a spreadsheet application in which a cell 1002 of a worksheet of the spreadsheet application is used (e.g., by the change-management module 318) to denote a changed or updated value to a start price of an item. Here, the start price is the initial price at which the item will be or was offered for sale using the applications 120 or 122. The cell 1002 of a worksheet is highlighted to denote the change.

FIG. 11 is a block diagram illustrating a portion 1100 of an example user interface of a spreadsheet application in which cells 1102 and 1104 of a worksheet of the spreadsheet application are used (e.g., by the change-management module 318) to denote changed or updated values of quantities and start prices, respectively, of multiple items. Here, the cells 1102 and 1104 are highlighted to denote the changes.

The change-management module 318 may associate job IDs with particular jobs, worksheets, or worksheet elements, including cells, such that the worksheet or worksheet element is updated automatically when data is received as a result of a successful completion of a job (or a portion of a job) associated with one of the job IDs. Additionally, the change-management module 318 may associate job IDs with the particular jobs, worksheets, or worksheet elements such that the change-management module 318 job may use the job ID to initiate a job to update the applications 120 and 122 with data that has changed in the particular worksheet or worksheet element.

Figure 12:
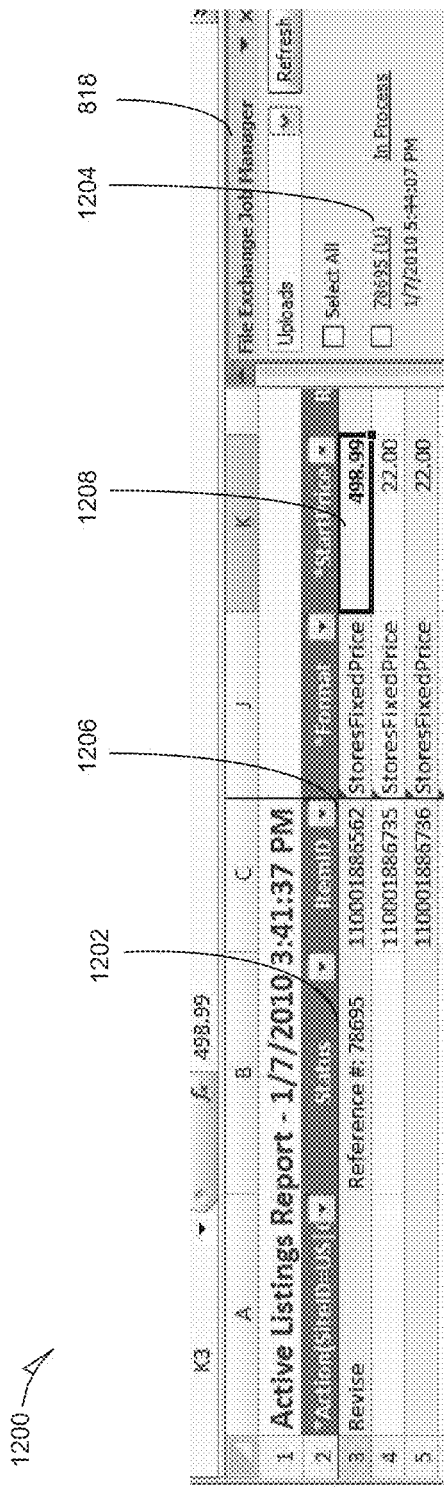
FIG. 12 is a block diagram illustrating a portion of an example user interface of a spreadsheet application in which a change to a value of a data item corresponding to an item listed for sale has been associated with a particular job.

FIG. 12 is a block diagram illustrating a portion 1200 of an example user interface of a spreadsheet application in which a change to a value of a data item corresponding to an item listed for sale has been associated (e.g., by the change-management module 318) with a particular job. In an embodiment, the change-management module 318 detects a change to the start price of an item. Cell 1208 includes the new start price (e.g., "$489.99") and is highlighted to denote the change. Cell 1206 includes an item identifier (e.g., "10001886562") corresponding to the item listed for sale with respect to applications 120 or 122. Cell 1202 includes a job ID corresponding to a job that the change-management module 318 is to initiate to update the applications 120 and 212 with the new start price of the item. Upon initiation of the job, the job manager 818 displays the job ID 1204 in a list of jobs.

After completion of a job (or a portion of a job), the change-management module 318 may update (e.g., using the presentation module 314) fields in the spreadsheet that are associated with the job to include the result of the job, such as a result of a performing of a particular operation on a particular item that was handled by the job (e.g., the result may include updating a status field associated with the particular item to specify whether updated data associated with the particular item was successfully synchronized with the applications 120 and 122).

Figure 13:
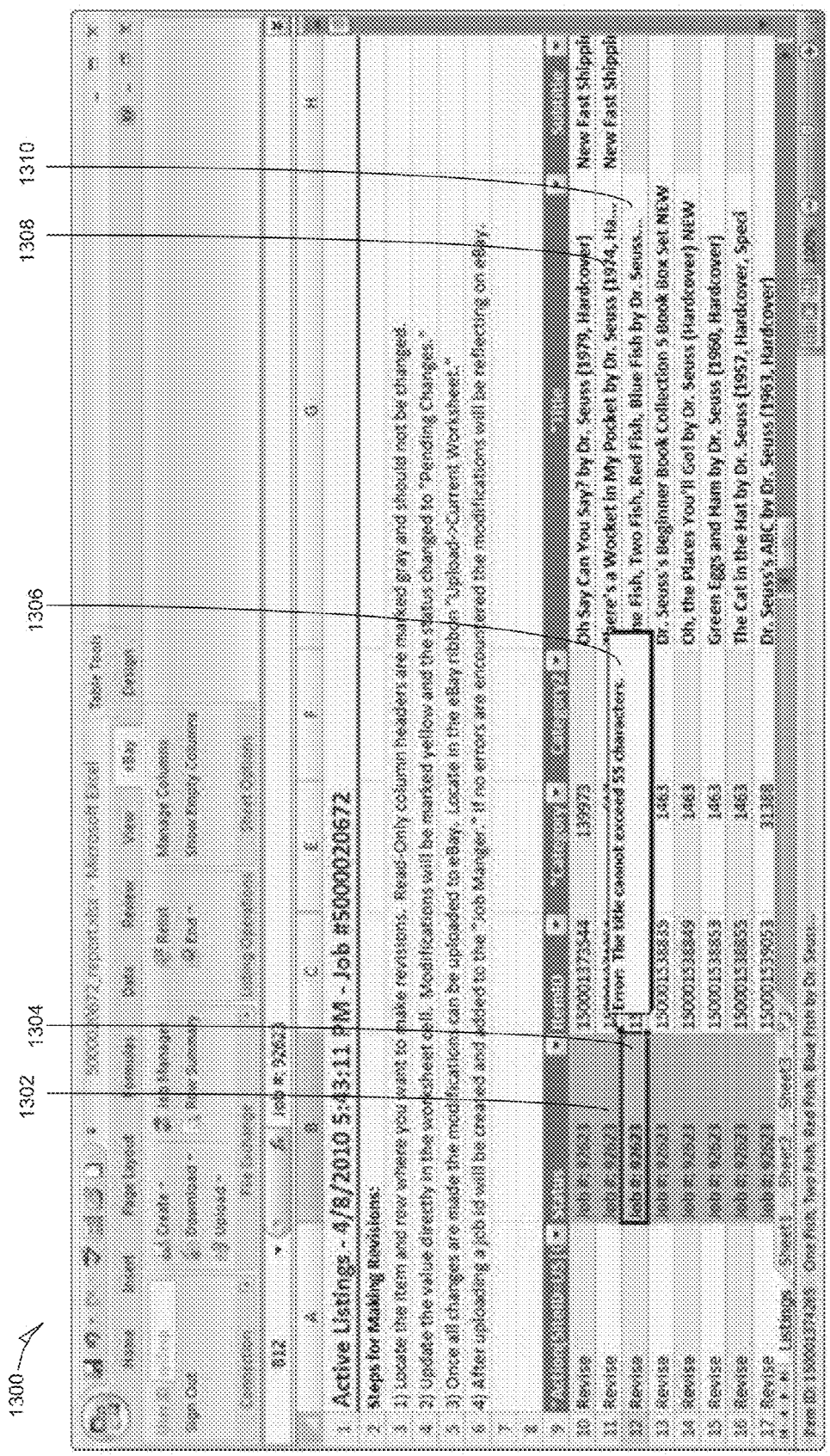
FIG. 13 is a block diagram illustrating a portion of an example user interface of a spreadsheet application in which it is indicated that a portion of a job was completed successfully but another portion of the job was not completed successfully.

FIG. 13 is a block diagram illustrating a portion 1300 of an example user interface of a spreadsheet application in which it is indicated that a portion of a job was completed successfully but another portion of the job was not completed successfully. The change-management module detects that values in cells 1308 and 1310 (e.g., titles) of two respective items offered for sale have changed. In response, the change-management module initiates a job to synchronize the titles with applications 120 or 122. During or after execution of the job, the change-management module 318 causes the cell 1302 to be highlighted in a particular color (e.g., green) to denote the successful completion of a portion of a job (e.g., job #92623) (e.g., the updating of a title of the first item offered for sale). The change-management module 318 causes the cell 1304 to be highlighted in a different particular color (e.g., red) to denote a failure to complete a portion of the job (e.g., the updating of the title of the second item offered for sale). The change-management module 318 displays information related to the error in a user interface element 1306 (e.g., a pop-up box). The information specifies the cause of the error (e.g., "The title cannot exceed 55 characters."). The change-management module 318 displays the user interface element 1306 in response to receiving a notification of the error from applications 120 or 122. The change-management module 318 displays the user interface element 1306 in response to a user selecting the cell 1304.

Figure 14:
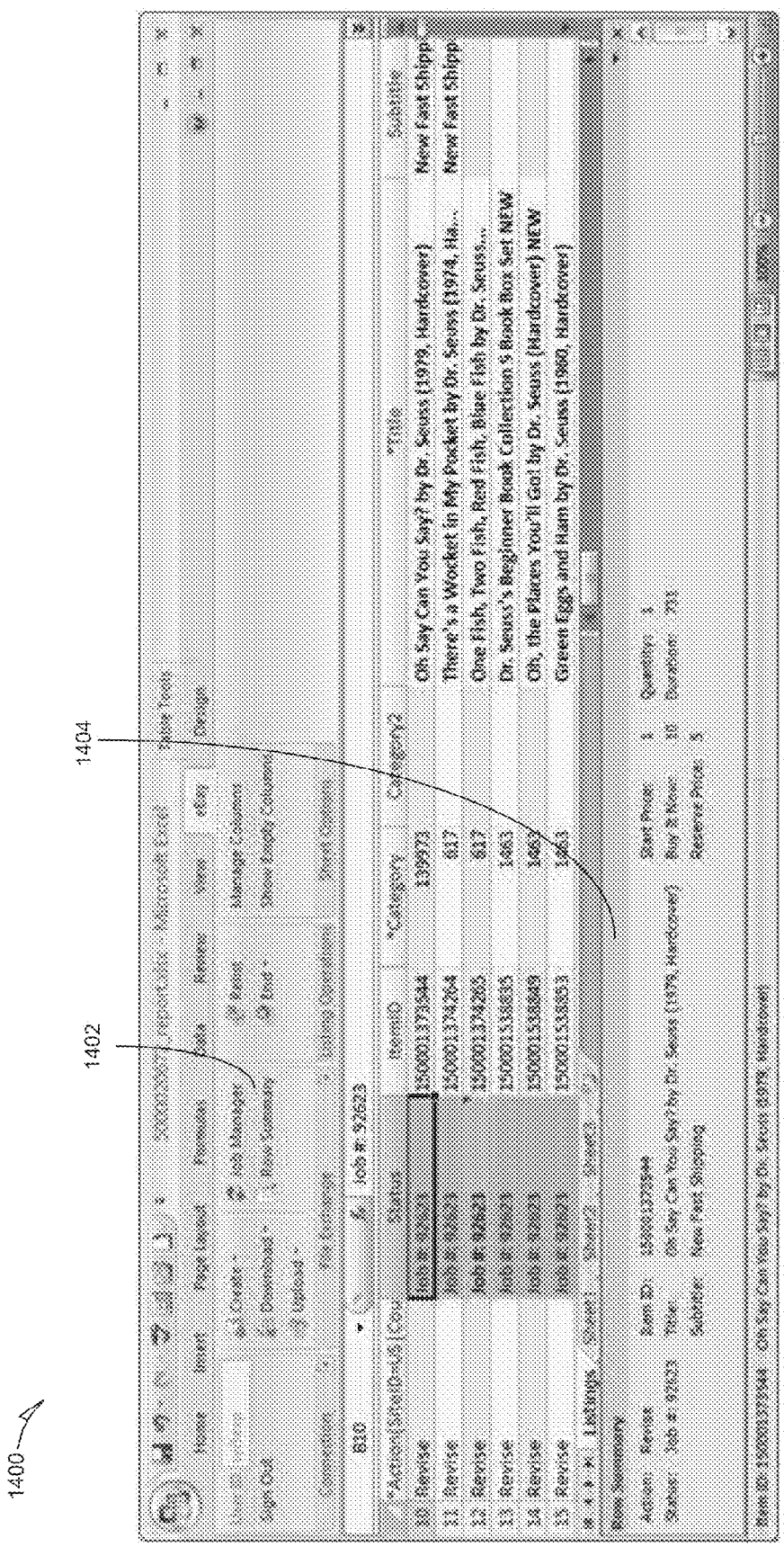
FIG. 14 is a block diagram illustrating a portion of an example user interface of a spreadsheet application into which a user interface element has been integrated to present a summary of data contained in a row of a worksheet of the spreadsheet application.

FIG. 14 is a block diagram illustration a portion 1400 of an example user interface of a spreadsheet application into which a user interface element 1404 has been integrated (e.g., by the presentation module 314) to present a summary of data contained in a row of a worksheet of the spreadsheet application. The user interface element 1404 may be shown or hidden in response to a selection by a user of a user interface element 1402 (e.g., a "Row Summary" button). The user interface element 1404 includes most or all of the information corresponding to a row of data in a worksheet of the spreadsheet application. For example, if the row includes information about an item listed for sale, such as whether data associated with the item is out of synchronization with applications 120 or 122, a status of a job to be initiated to synchronize the data with applications 120 or 212, an item identifier to uniquely identify the item with respect to the applications 120 or 122, one or more categories of the item (e.g., categories defined by the applications 120 or 122), a title of the item, a subtitle of the item, a start price, a quantity, a buy-it-now price, a duration, or a reserve price, the user interface element 1404 presents all of the information. The information may be presented in the user element 1404 such that a user need not engage a scrolling mechanism of the spreadsheet application to bring columns of data associated with a row into a particular view of the spreadsheet application.

Referring back to FIG. 3, the plug-in 174 may include a dependency-management module 320. The dependency-management module 320 manages dependencies between elements of a spreadsheet, including dependencies between cells of one or more worksheets, such that data associated with elements that are dependent on one another is automatically updated when one of the elements is updated. The dependency-management module 320 also manages dependencies such that a request to the applications 120 or 122 that involves updating one of the elements includes a request to update elements that depend on the one of the elements. The dependency-management module 320 also enables the user to manage dependencies between the elements.

The dependency-management module 320 applies knowledge of the dependencies to select particular ones of the elements to include in a particular job. Furthermore, the dependency-management module 320 allows the user to specify rules governing which elements, whether dependent on or independent of one another, are included in which jobs. For example, the dependency-management module 320 provides a mechanism for linking data in particular elements with a unit of work. Then, the dependency-management module 320 initiates jobs associated with a unit of work, automatically including the data contained in the corresponding elements. Thus, the dependency-management module 320 selectively includes in a job data relating to all or most of the elements in a spreadsheet, or a subset of the elements, such as data related to elements that depend on a particular element being updated or data that is linked to a predetermined unit of work (e.g., a unit of work defined by a user or business rules received from the applications 120 and 122).

The interface module 304 may present a user interface (e.g., a dialog box) that processes inputs and outputs to one or more functionalities of the applications 120 or 122. The user interface includes one or more user interface elements for accepting input parameters associated with one or more APIs corresponding to the functionality. The user interface also includes one or more user interface elements for displaying output parameters (e.g., results) corresponding to invocations of the one or more APIs. The interface module 304 initiates a job for communicating the inputs to the applications 120 or 122 (e.g., via the API). The execution module 306 executes the job. For example, the execution module 306 invokes the API, passing the inputs as parameters to the API. The interface module 304 initiates the job in response to an interaction by the user with user interface element of the user interface. The interface module 304 receives the results of the job (e.g., from the execution module 306). In response to receiving the results, the interface module 304 updates a user interface element with the results.

Figure 15:
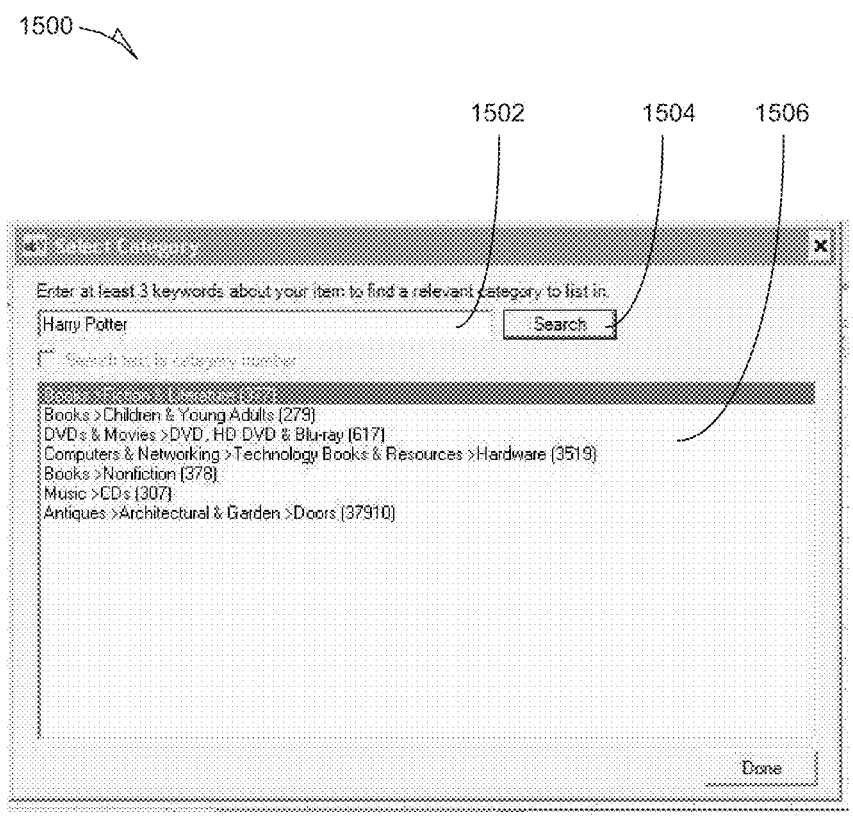
FIG. 15 is a block diagram illustrating a user interface that processes inputs and outputs related to a category searching functionality of an application.

FIG. 15 is a block diagram illustrating a user interface 1500 (e.g., a pop-up dialog box presented by the interface module 304) that processes inputs and outputs related to a category searching functionality of applications 120 or 122. The user interface 1500 includes a user interface element 1502 (e.g., a text box) in which a user can provide inputs to an API provided by the applications 120 or 122 for searching for a category corresponding to information about an item to be listed for sale with respect to the applications 120 or 122. The inputs may be information about the item (e.g., keywords related to the item). For example, if the item relates to Harry Potter, the inputs may be the keywords "Harry Potter." In response to receiving the inputs, the interface module 304 invokes the API (e.g., via the execution module 306). For example, the interface module 304 invokes the API, passing the inputs as parameters to the API. The interface module 304 invokes the API in response to an interaction by the user with user interface element 1504 (e.g., a "Search" button). The interface module 304 receives the results of the invocation of the API (e.g., from the execution module 306). In response to receiving the results, the interface module 304 updates a user interface element 1506 with the results. For example, the interface module 304 updates the user interface element 1506 with a list of categories that may correspond to the information provided about the item. Examples of categories matching the "Harry Potter" keywords may include "Books>Fiction & Literature," or Books>Children & Young Adults," and so on. A user may then select one of the outputs to associate with an item (e.g., an item included on a worksheet that includes data items related to active listings of items for sale).

Referring back to FIG. 3, the plug-in 174 may include a template module 322. The template module 322 may automatically generate a template (e.g., a worksheet, document, or file) within the spreadsheet application that corresponds to a set of data that may be synchronized between the worksheet and the applications 120 or 122. For example, the template module 322 may automatically create a worksheet corresponding to a set of data relating to a listing of an item for sale, including columns for information about the item. Alternatively, the template module 322 may receive the template from the applications 120 and 122.

Figure 16:
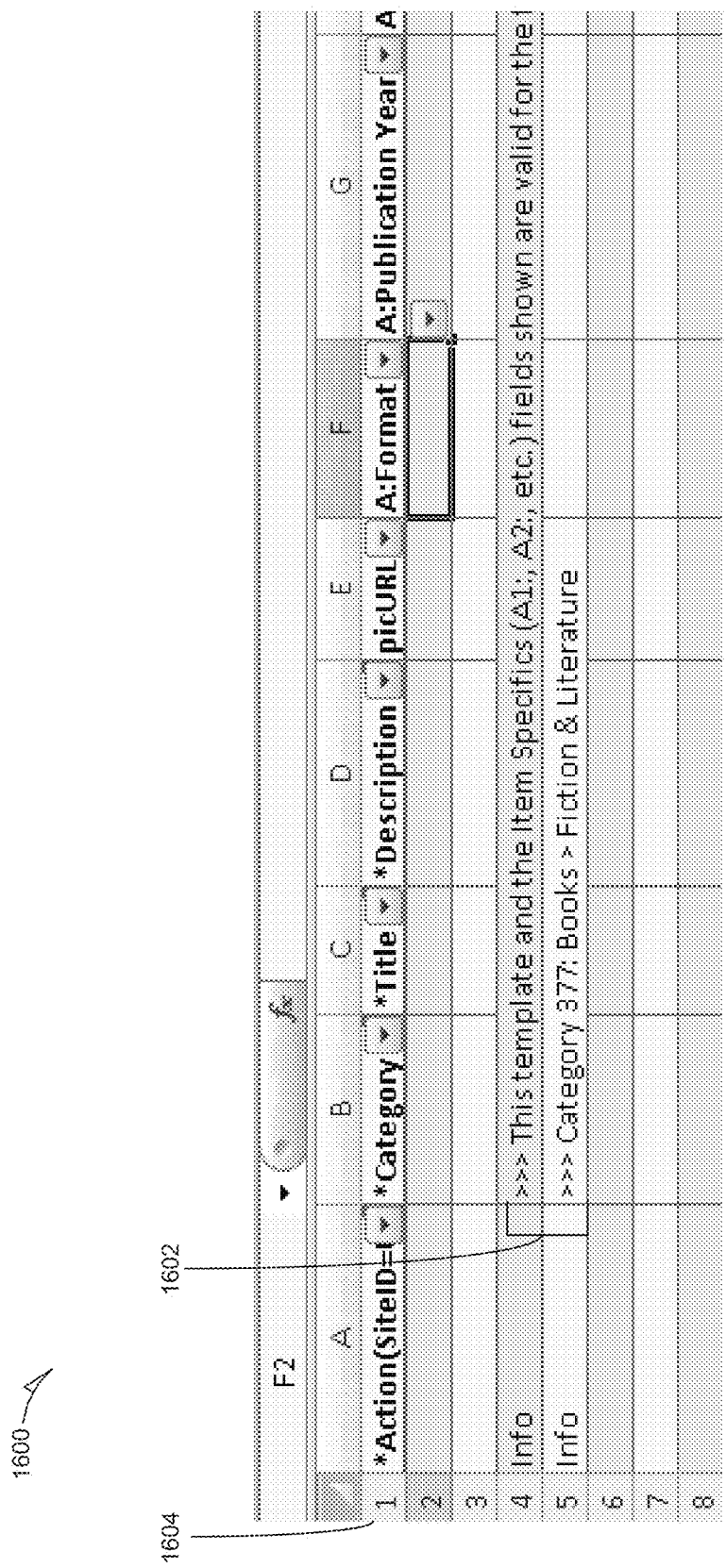
FIG. 16 is a block diagram illustrating a portion of an example user interface of a spreadsheet application into which a template related to listings of items in a particular category has been integrated.

FIG. 16 is a block diagram illustrating a portion 1600 of an example user interface of a spreadsheet application into which a template related to listings of items in a particular category has been integrated. The template may be generated by the template module 322 or received by the template module 322 from the applications 120 or 122. The template may include a description 1602, such as information about a listing category (e.g., "Books>Fiction & Literature") to which the template applies. The template may include column headings 1604 for data items to be provided to the applications 120 or 212 via the template (e.g., "Title," "Description," "picURL," "Format," "Publication Year," and so on). For each data item in the template, the template module 322 may generate, receive, or access a list of valid or suggested values for each field of the template. The list of valid or suggested values may be integrated into the data validation capabilities of the spreadsheet application, as described above with respect to the metadata-integration module 316. For example, the list of valid or suggested values for a data item may be presented in a drop-down list associated with a cell in which the value of the data item is presented.

Referring back to FIG. 3, the plug-in 174 may include an organization module 324. The organization module 324 may support a managing or organizing of data, including downloaded data, uploaded data, and jobs data. For example, the organization module 324 may provide a mechanism for adding or removing folders that may be used to group the data. The folders may then be integrated into other elements of the user interface provided by the spreadsheet application or the plug-in 174, such as the user interface elements associated with the job manager. Moreover, the organization module 324 may also support a tagging mechanism. For example, the organization module 324 automatically tags data associated with a seller's items that need restocking with a "restock" tag. Or the organization module 324 automatically tags data associated with operations performed by a particular user with the user's name, thereby allowing, for example, a company providing listings to keep track of who is performing a particular operation, such as uploading, downloading, revising inventory, and so on. The organization module 324 may perform such tagging according to predetermined or configurable tagging rules provided by the user or an administrator of the plug-in 174. Additionally, the organization module 324 may enable manual tagging of data items or jobs by the user. The organization module 324 may implement tags as metadata associated with a spreadsheet element, such as a workbook, worksheet, or cell. The organization module 324 may use the tagging mechanism to determine dependencies or group related data.

Figure 17:
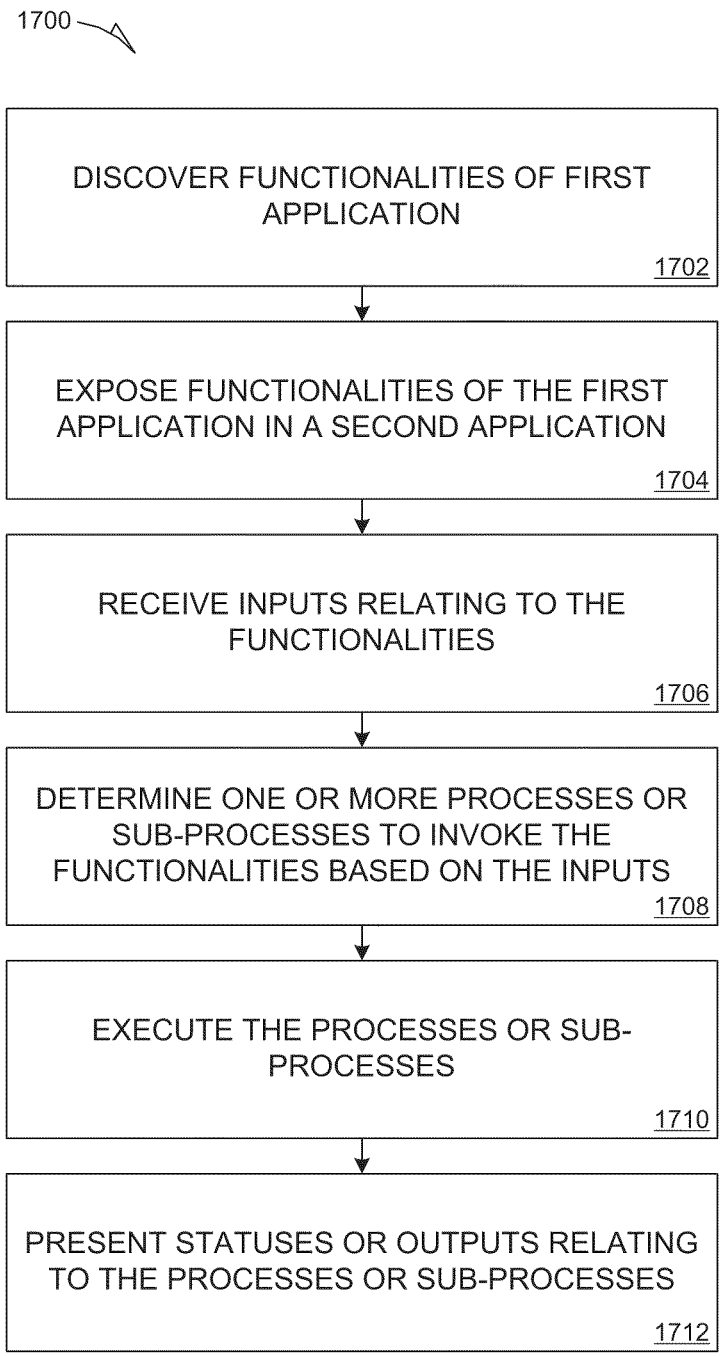
FIG. 17 is a flowchart illustrating an example embodiment of a method to use a software application module to integrate functionalities of a first application into a second application.

FIG. 17 is a flowchart illustrating an example embodiment of a method 1700 to use a software application module (e.g., the plug-in 174) to integrate functionalities of a first application (e.g., one of the applications 120 or 122) into a second application (e.g., the programmatic client 108). An example of the programmatic client 108 may be a spreadsheet application (e.g., Microsoft Excel). At operation 1702, the software application module may discover (e.g., using the interface module 304) one or more functionalities of the first application. For example, the software application module may discover the functionalities of the first application by querying the first application using an API. Alternatively, the software application module may discover the functionalities of the first application based on information it receives about the first application from a separate entity (e.g., an administrator of the software application module). For example, if the first application is one of the applications 120 or 122, the software application module may discover functionalities corresponding to synchronizing data items between the first application and the second application, such as data items relating to a type of listing of items associated with the applications 120 or 122. Such types of listings may include listings of items that are currently for sale (e.g., active listings), listings of items that have been sold and are awaiting shipment, or listings of items associated with particular categories of items (e.g., books, music, clothes, shoes, accessories, and so on), or any other types of listings that the first application supports or defines. The software application module may also discover information relating to inputs (e.g., parameters corresponding to APIs) or outputs (e.g., return types) associated with the functionalities.

At operation 1704, the software application module may expose (e.g., using the interface module 304) the functionalities of the first application in the second application. Exposing the functionalities may include presenting (e.g., via the interface module 304) a user interface for invoking the functionalities. For example, the software application module may present a user interface that includes elements (e.g., buttons) for invoking various ones of the discovered functionalities. The user interface for invoking the functionalities may include user interface elements corresponding to inputs or outputs associated with the functionalities. Additionally, the software application module may supply or use default values for the inputs. If the first application is one of the applications 120 or 122, the user interface may include any one or combination of the user interfaces similar to those discussed above with respect to FIGS. 4-16. The software application module may group related functionalities together (e.g., within a drop-down button on a menu bar or within a dialog box). The software application module may use the native user interface elements (e.g., native button, dialog box, view, or other user interface elements) of the second application to expose the functionalities of the first application in the second application. Thus, the software application module may tightly integrate the functionalities of the first application into the second application such that the functionalities appear to be part of the second application.

At operation 1706, the software application module may receive (e.g., via the interface module 304) inputs relating to the functionalities of the first application. The inputs may be received via the user interface presented by the software application module. Alternatively, the inputs may be received programmatically (e.g., via an API call) or another mechanism (e.g., received from any one or combination of the modules of the software application module as part of an initiation of a process). The software application module may supply default values for any inputs that are used for the invocation of a particular functionality and for which corresponding values are not received.

At operation 1708, the software application module may determine (e.g., using the scatter-gather module 308) one or more jobs (e.g., processes or sub-processes) to invoke the functionalities based on the inputs. At operation 1710, the software application module may execute (e.g., using the execution module 306) the jobs. For example, the software application module may call an API of the first application, passing the inputs as parameters of the API. At operation 1712, the software application module may present statuses or outputs relating to the jobs. The software application module may present such statuses or outputs before, during, or after the executing of the jobs. In various embodiments, the software application module may present (e.g., using the job-management module 312) statuses of the jobs in a user interface (e.g., the job manager 818). In various embodiments, the software application module may present (e.g., using the presentation module 314) outputs in native user interface elements (e.g., a text box or a cell of a worksheet) of the programmatic client 108.

Figure 18:
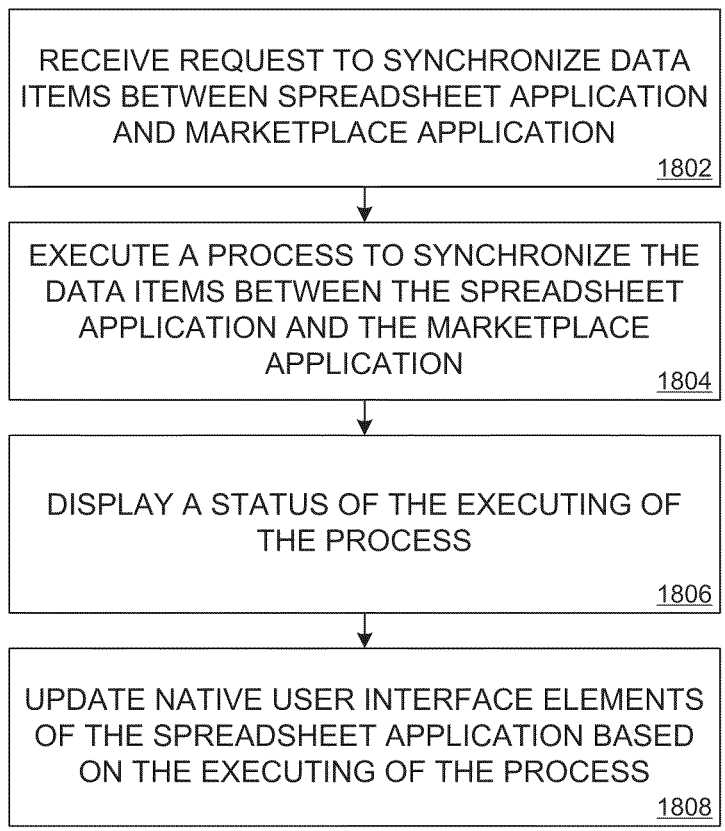
FIG. 18 is a flowchart illustrating an example embodiment of a method to use a software application module to synchronize data items between a spreadsheet application and one of the marketplace applications.

FIG. 18 is a flowchart illustrating an example embodiment of a method to use a software application module (e.g., the plug-in 174) to synchronize data items between a spreadsheet application (e.g., Microsoft Excel) and one of the marketplace applications 120. At operation 1802, the software application module receives (e.g., via the interface module 304) a request to synchronize data items between the spreadsheet application and the marketplace application. The request may be received as a result of a user interacting with a user interface element associated with the spreadsheet application (e.g., a user interface element presented by the interface module 304). The data items may relate to a type of listing of items associated with the marketplace applications 120. Such types of listings may include listings of items that are currently for sale (e.g., items in active listings), listings of items that are awaiting shipment, or listings of items associated with particular categories of items (e.g., books, music, clothes, shoes, accessories, and so on), or any other types of listings that the marketplace application supports or defines. Alternatively, the request may be received as a result of a programmatic request received by the spreadsheet application (e.g., via an API).

At operation 1804, the software application module executes (e.g., using the execution module 306) a job to synchronize the data items between the spreadsheet application and the marketplace application. At operation 1806, the software application module displays a status of the executing of the job (e.g., in a native user interface element of the spreadsheet application). At operation 1808, the software application module updates (e.g., using the presentation module 314) native user interface elements of the spreadsheet application based on the executing of the job. The updating may include overwriting old values with new values, highlighting cells of the worksheet containing values that changed during the executing of the job, integrating metadata, or reporting statuses associated with the executing of the job, as described above with respect to FIGS. 8A-14.

Figure 19:
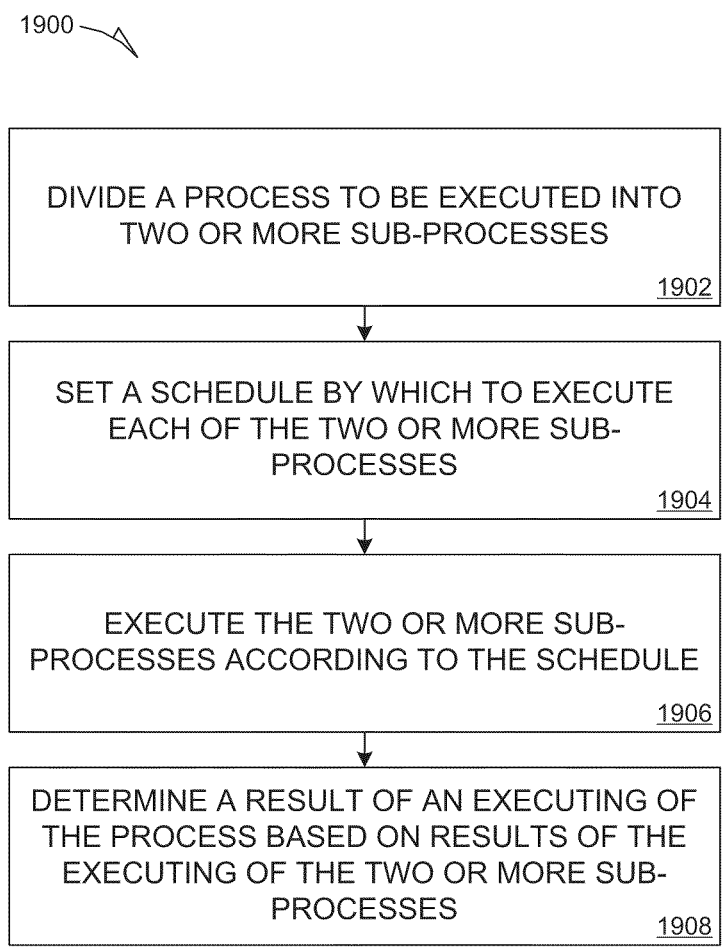
FIG. 19 is a flowchart illustrating an example embodiment of a method to use a software application module to execute a process by dividing the process into two or more sub-processes.

FIG. 19 is a flowchart illustrating an example embodiment of a method 1900 to use a software application module (e.g., plug-in 174) to execute a job (e.g., a process) by dividing the job into two or more sub-jobs (e.g., sub-processes). At operation 1902, the software application module may divide (e.g., using the scatter-gather module 308) the job to be executed into two or more sub-jobs. At operation 1904, the software application module may set a schedule by which to execute each of the two or more sub-jobs. At operation 1906, the software application module may execute the two or more sub-jobs according to the schedule. At operation 1908, the software application module may determine a result of the executing of the jobs based on results of the executing of the two or more sub-jobs.

Figure 20:
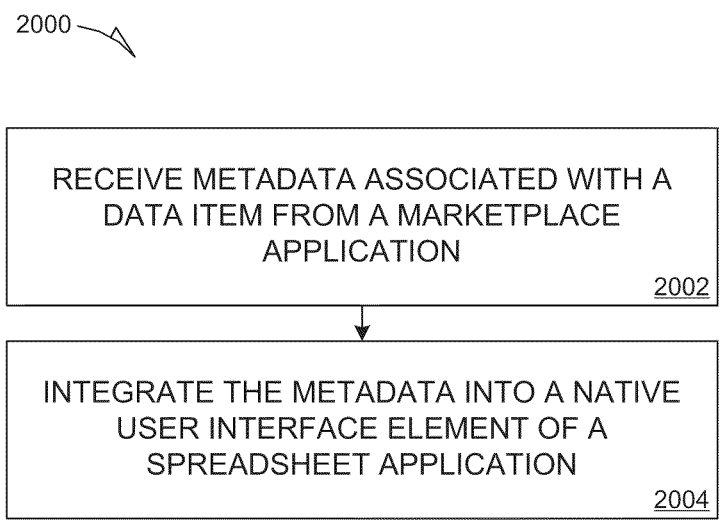
FIG. 20 is a flowchart illustrating an example embodiment of a method to use a software application module to integrate metadata received from a marketplace application into a spreadsheet application.

FIG. 20 is a flowchart illustrating an example embodiment of a method 2000 to use a software application module (e.g., plug-in 174) to integrate metadata received from a marketplace application into a spreadsheet application. At operation 2002, the software application module receives (e.g., using the interface module 304) metadata associated with a data item from the marketplace application. At operation 2004, the software application module integrates (e.g., using the metadata-integration module 316) the metadata into a native user interface element of the spreadsheet application.

Although parts of the above discussion describe the plug-in 174 as being integrated into a spreadsheet application, it will be understood by one having ordinary skill in the art that the plug-in 174 may be integrated into other types of applications, such as a word-processor application (e.g., Microsoft Word), a database application (e.g., Microsoft Access), or another type of application. Additionally, the plug-in 174 may not be a plug-in at all, but rather a stand-alone application or library (e.g., an executable file or dynamic link library). Furthermore, it will be understood by one having ordinary skill in the art that the plug-in 174 may be designed to expose functionality in separate applications wherever they may be located (e.g., client-side applications or server-side applications). In other words, the plug-in 174 is not limited to exposing functionality of server-side applications like applications 120 and 122. Furthermore, although the above discussion provides examples of applications 120 and 122 being marketplace and payment applications, it is contemplated that applications that the application module interacts with may be other types of applications, including applications outside the domain of e-commerce.

The plug-in 174 may interact with applications by using APIs provided by the applications, an add-in or macro capability provided by the applications (e.g., Microsoft Visual Basic for Applications), or another technology by which the applications expose their functionality or provide for integration of or interaction with separate or integrated applications or application modules. The plug-in 174 may, in turn, expose its functionality to other users, including a person or a machine, through a user interface or an API. That is, the plug-in 174 itself may be programmable.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 21:
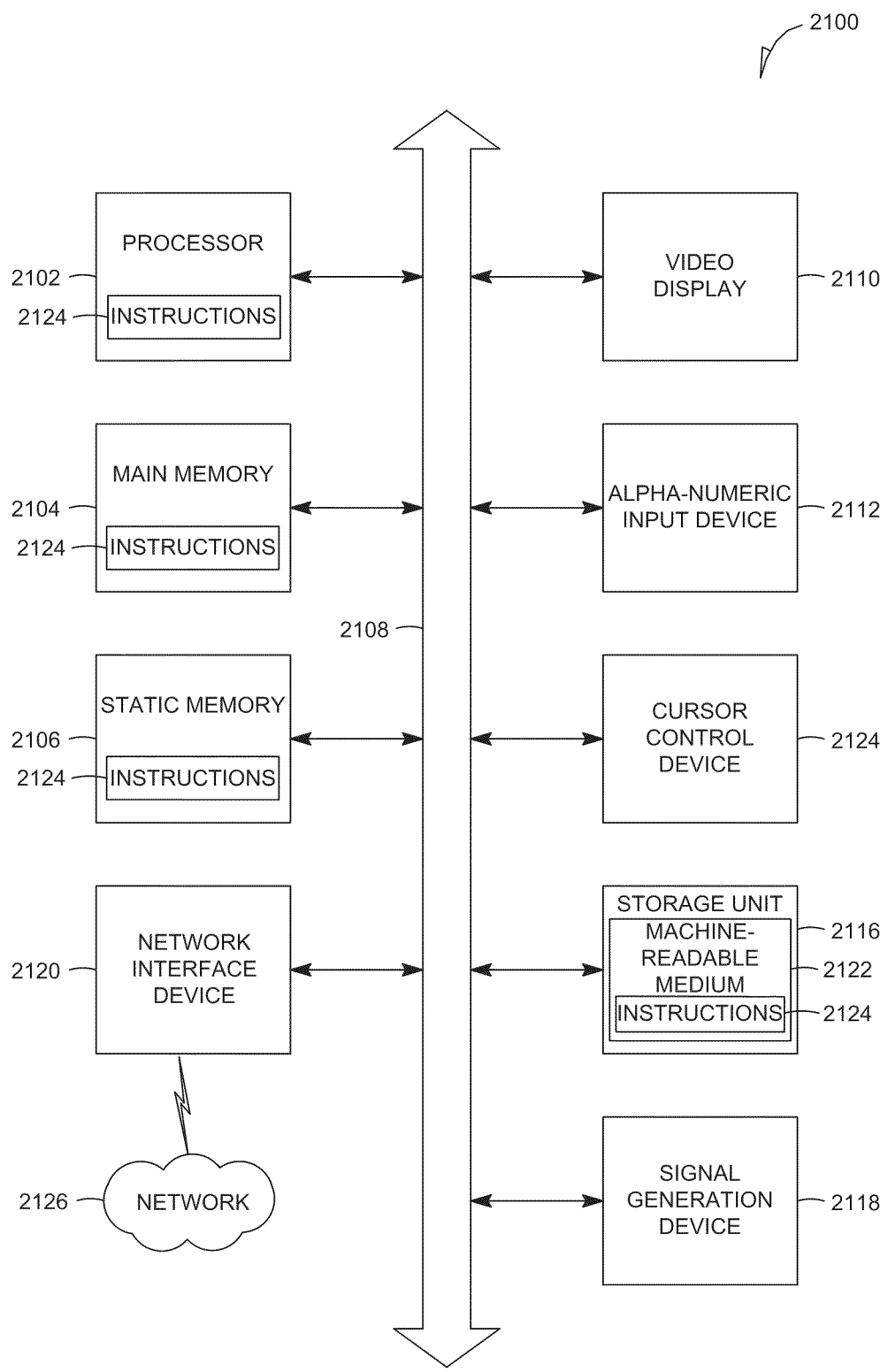
FIG. 21 is a block diagram of an example machine on which methodologies described herein may be executed.

FIG. 21 is a block diagram of a machine in the example form of a computer system 2100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU), a graphics processing unit (GPU) or both), a main memory 2104 and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alphanumeric input device 2112 (e.g., a keyboard), a user interface (UI) navigation (or cursor control) device 2114 (e.g., a mouse), a disk drive unit 2116, a signal generation device 2118 (e.g., a speaker) and a network interface device 2120.

Machine-Readable Medium

The disk drive unit 2116 includes a machine-readable medium 2122 on which is stored one or more sets of instructions and data structures (e.g., software) 2124 embodying or utilized by any one or more of the methodologies or functions described herein. The instructions 2124 may also reside, completely or at least partially, within the main memory 2104 and/or within the processor 2102 during execution thereof by the computer system 2100, the main memory 2104 and the processor 2102 also constituting machine-readable media. The instructions 2124 may also reside, completely or at least partially, within the static memory 2106.

While the machine-readable medium 2122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 2124 may further be transmitted or received over a communications network 2126 using a transmission medium. The instructions 2124 may be transmitted using the network interface device 2120 and any one of a number of well-known transfer protocols (e.g., Hyper Text Transfer Protocol or HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
receiving a request to synchronize a first plurality of data items between a spreadsheet application and a marketplace application, the first plurality of data items relating to a first type of listing of items associated with the marketplace application;
in response to the receiving of the request to synchronize the first plurality of data items, using a processor to execute a first process, the first process to synchronize the first plurality of data items between the spreadsheet application and the marketplace application, the first process to include at least one of downloading one of the first plurality of data items from the spreadsheet application and uploading one of the first plurality of data items to the marketplace application, the executing of the first process to occur independently of the executing of the spreadsheet application;
presenting the first plurality of data items in a plurality of cells of a first worksheet of the spreadsheet application;
updating the plurality of cells of the first worksheet during the executing of the first process; and
displaying a status of the executing of the first process in a native user interface element of the spreadsheet application.

2. The method of claim 1, further comprising:
receiving a request to synchronize a second plurality of data items between the spreadsheet application and the marketplace application, the second plurality of data items relating to a second type of listing of items associated with the marketplace application;
in response to the receiving of the request to synchronize the second plurality of data items, executing a second process, the second process to synchronize the second plurality of data items between the spreadsheet application and the marketplace application, the second process to include at least one of downloading one of the second plurality of items from the spreadsheet application and uploading one of the second plurality of items to the marketplace application, the executing of the second process to occur independently of the executing of the spreadsheet application and the executing of the first process; and
displaying a status of the executing of the second process in the native user interface element of the spreadsheet application.

3. The method of claim 1, farther comprising:
separating the first process into a plurality of sub-processes;
setting a. schedule by which to execute each of the plurality of sub-processes; and
executing the plurality of sub-processes according to the schedule.

4. The method of claim 1, wherein the native user interface element includes an interface to manage a plurality of life cycles of a plurality of processes, the plurality of processes including the first process.

5. The method of claim 1, wherein the downloading of the first plurality of data items includes downloading metadata, the metadata including a list of values corresponding to one of the plurality of data items, the method further comprising integrating the list of values into a cell of the first worksheet, the cell corresponding to the one of the first plurality of data items.

6. The method of claim 1, further comprising formatting a plurality of cells of the first worksheet based on a template that corresponds to the type of listing.

7. A system comprising:
a reception module to receive a request to synchronize a first plurality of data items between a spreadsheet application and a marketplace application, the first plurality of data items relating to a first type of listing of items associated with the marketplace application;
an execution module to, in response to the receiving of the request to synchronize the first plurality of data items, use a processor to execute a first process, the first process to synchronize the first plurality of data items between the spreadsheet application and the marketplace application, the first process to include at least one of downloading one of the first plurality of items from the spreadsheet application and uploading one of the first plurality of data items to the marketplace application, the executing of the first process to occur independently of the executing of the spreadsheet application;
a presentation module to present the first plurality of data items in a plurality of cells of a first worksheet of the spreadsheet application and update the plurality of cells of the first worksheet during the executing of the first process; and
a job manager module to display a status of the executing of the first process in a native user interface element of the spreadsheet application.

8. The system of claim 7, wherein:
the reception module is further to receive a request to synchronize a second plurality of data items between the spreadsheet application and the marketplace application, the second plurality of data items relating to a second type of listing of items associated with the marketplace application;
the execution module is further to, in response to the detecting, execute a second process, the second process to synchronize the second plurality of data items between the spreadsheet application and the marketplace application, the second process to include at least one of downloading one of the second plurality of items to the spreadsheet application and uploading one of the second plurality of items to the marketplace application, the executing of the second process to occur independently of the executing of the spreadsheet application and the executing of the first process; and the job manager module is further to display a status of the executing of the second process in the native user interface element of the spreadsheet application.

9. The system of claim 7, further comprising:
a scatter-gather module to:
divide the first process into a plurality of sub-processes;
set a schedule by which to execute each of the plurality of sub-processes; and
execute the plurality of sub-processes according to the schedule.

10. The system of claim 7, wherein the job-management module is further to present a user interface to manage a plurality of life cycles of a plurality of processes, the plurality of processes including the first process.

11. The system of claim 7, wherein the downloading of the first plurality of data items includes downloading metadata the metadata including a list of values corresponding to one of the plurality of data items, the system further comprising a metadata integration module to integrate the list of values into a cell of the first worksheet, the cell corresponding to the one of the first plurality of data items.

12. The system of claim 7, further comprising a template module to format a plurality of cells of the first worksheet based on a template that corresponds to the type of listing.

13. A non-transitory machine readable medium embodying a set of instructions that, when executed by a processor, causes the processor to perform operations, the operations comprising:
receiving a request to synchronize a first plurality of data items between a spreadsheet application executing on a client machine and a marketplace application executing on a server machine, the first plurality of data items relating to a first type of listing of items associated with the marketplace application;
in response to the receiving of the request to synchronize the first plurality of data items, using a processor to execute a first process to synchronize the first plurality of data items between the first worksheet and a marketplace application executing on a server machine, the first process to include at least one of downloading one of the first plurality of data items from the spreadsheet application and uploading one of the first plurality of data items to the marketplace application, the executing of the first process to occur independently of the executing of the spreadsheet application;
presenting the first plurality of data items in a plurality of cells of a first worksheet of the spreadsheet application;
updating the plurality of cells of the first worksheet during the executing of the first process; and
displaying a status of the executing of the first process in a native user interface element of the spreadsheet application.

14. The non-transitory machine readable medium of claim 13, the method further comprising:
receiving a request to synchronize a second plurality of data items between the spreadsheet application and the marketplace application, the second plurality of data items relating to a second type of listing of items associated with the marketplace application;
in response to the receiving of the request to synchronize the second plurality of data items, executing a second process to synchronize the second plurality of data items between the spreadsheet application and the marketplace application, the second process to include at least one of downloading one of the second plurality of items from the spreadsheet application and uploading one of the second plurality of items to the marketplace application, the executing of the second process to occur independently of the executing of the spreadsheet application and the executing of the first process; and
displaying a status of the executing of the second process in the native user interface element of the spreadsheet application.

15. The non-transitory machine readable medium of claim 13, the method further comprising:
separating the first process into a plurality of sub-processes;
setting a schedule by Which to execute each of the plurality of sub-processes; and
executing the plurality of sub-processes according to the schedule.

16. The non-transitory machine readable medium of claim 13, wherein the native user interface element includes an interface to manage a plurality of life cycles of a plurality of processes, the plurality of processes including the first process.

17. The non-transitory machine readable medium of claim 13, wherein the downloading of the first plurality of data items includes downloading metadata, the metadata including a list of values corresponding to one of the plurality of data items, the method farther comprising integrating the list of values into a cell of the first worksheet, the cell corresponding to the one of the first plurality of data items.

* * * * *

UNITED STATES PATENT AND TRADEMARK OFFICE
CERTIFICATE OF CORRECTION

PATENT NO. : 8,578,289 B2  Page 1 of 1
APPLICATION NO. : 12/872802
DATED : November 5, 2013
INVENTOR(S) : Lai et al.

It is certified that error appears in the above-identified patent and that said Letters Patent is hereby corrected as shown below:

In the Claims

In column 28, line 4, in Claim 3, delete "farther" and insert --further--, therefor In column 28, line 7, in Claim 3, delete "a." and insert --a--, therefor In column 29, line 16, in Claim 11, delete "metadata" and insert --metadata,--, therefor In column 30, line 31, in Claim 15, delete "Which" and insert --which--, therefor In column 30, line 44, in Claim 17, delete "farther" and insert --further--, therefor Signed and Sealed this
Twenty-fifth Day of November, 2014

Michelle K. Lee
*Deputy Director of the United States Patent and Trademark Office*